(12) United States Patent
Unterguggenberger et al.

(10) Patent No.: US 12,181,849 B2
(45) Date of Patent: Dec. 31, 2024

(54) CONTROL OF SEMICONDUCTOR MANUFACTURING EQUIPMENT IN MIXED REALITY ENVIRONMENTS

(71) Applicant: Lam Research Corporation, Fremont, CA (US)

(72) Inventors: Rainer Unterguggenberger, Newark, CA (US); Christopher Thorgrimsson, San Ramon, CA (US); Henry T. Chan, Morgan Hill, CA (US); Chung-Ho Huang, San Jose, CA (US); Terrence George Bernier, Hillsboro, OR (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 18/554,823

(22) PCT Filed: Apr. 11, 2022

(86) PCT No.: PCT/US2022/024232
§ 371 (c)(1),
(2) Date: Oct. 11, 2023

(87) PCT Pub. No.: WO2022/221178
PCT Pub. Date: Oct. 20, 2022

(65) Prior Publication Data
US 2024/0192653 A1    Jun. 13, 2024

Related U.S. Application Data

(60) Provisional application No. 63/201,134, filed on Apr. 14, 2021.

(51) Int. Cl.
*G06F 3/01* (2006.01)
*G05B 19/042* (2006.01)
(Continued)

(52) U.S. Cl.
CPC ......... *G05B 19/0425* (2013.01); *G06F 3/012* (2013.01); *G06T 15/20* (2013.01);
(Continued)

(58) Field of Classification Search
CPC .... G05B 19/0425; G06V 20/20; G06F 3/012; G06T 15/20; G06T 17/00; G06T 19/006; G06T 2200/24; H01L 21/67242
See application file for complete search history.

(56) References Cited

U.S. PATENT DOCUMENTS

2014/0240484 A1* 8/2014 Kodama ............ G02B 27/017
　　　　　　　　　　　　　　　　　　　348/86
2014/0364208 A1* 12/2014 Perry ................... A63F 13/355
　　　　　　　　　　　　　　　　　　　463/31
(Continued)

FOREIGN PATENT DOCUMENTS

WO    WO-2020054905 A1    3/2020

OTHER PUBLICATIONS

International Preliminary Report on Patentability dated Oct. 26, 2023, in Application No. PCT/US2022/024232.
(Continued)

*Primary Examiner* — Robert J Michaud
(74) *Attorney, Agent, or Firm* — Weaver Austin Villeneuve & Sampson LLP

(57) ABSTRACT

Various embodiments herein relate to a Mixed Reality (MR) control platform to operate a semiconductor manufacturing tool in an MR environment and to display data associated with the semiconductor manufacturing tool. In son embodiments, the MR control platform comprises an MR control system and an MR headset. The MR control system can obtain sensor data representative of sensor output from a semiconductor manufacturing tool. The MR control system can determine operational information associated with the
(Continued)

semiconductor manufacturing tool and based on the sensor data. The MR control system can cause the operational information to be transmitted to the MR headset. The MR headset can receive the operational information associated with the semiconductor manufacturing tool from the MR control system. The MR headset can cause content associated with the operational information and one or more control features to be rendered in an MR environment.

30 Claims, 21 Drawing Sheets

(51) Int. Cl.
| | |
|---|---|
| *G06T 15/20* | (2011.01) |
| *G06T 17/00* | (2006.01) |
| *G06T 19/00* | (2011.01) |
| *G06V 20/20* | (2022.01) |
| *H01L 21/67* | (2006.01) |

(52) U.S. Cl.
CPC ............ *G06T 17/00* (2013.01); *G06T 19/006* (2013.01); *G06V 20/20* (2022.01); *H01L 21/67242* (2013.01); *G06T 2200/24* (2013.01)

(56) References Cited

U.S. PATENT DOCUMENTS

| | | | |
|---|---|---|---|
| 2018/0307045 A1 | 10/2018 | Nishi | |
| 2019/0035305 A1 | 1/2019 | Robertson et al. | |
| 2021/0398831 A1* | 12/2021 | Oberai | G06Q 10/20 |

OTHER PUBLICATIONS

International Search Report and Written Opinion dated Jul. 29, 2022 in Application No. PCT/US2022/024232.

* cited by examiner

CONTROL OF SEMICONDUCTOR MANUFACTURING EQUIPMENT IN MIXED REALITY ENVIRONMENTS

INCORPORATION BY REFERENCE

A PCT Request Form is filed concurrently with this specification as part of the present application. Each application that the present application claim benefit of or priority to as identified in the concurrently filed PCT Request Form is incorporated by reference herein in its entirety and for all purposes.

BACKGROUND

Semiconductor manufacturing equipment may be very complex, and may also be physically large and/or may include opaque walls, which may make it difficult to determine a state of the equipment from visual inspection. Status information associated with operation of semiconductor manufacturing equipment (e.g., a current operational status, current sensor values, etc.) may generally be presented on a display screen, such as a display screen attached to the semiconductor manufacturing equipment.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor implicitly admitted as prior art against the present disclosure.

SUMMARY

Disclosed herein are systems, methods, and media for operating a semiconductor manufacturing tool in a Mixed Reality (MR) environment and display data associated with the semiconductor manufacturing tool in an MR environment.

In accordance with some embodiments, an MR control platform to operate a semiconductor manufacturing tool in an MR environment and to display data associated with the semiconductor manufacturing tool is provided. In some embodiments, the MR control platform comprises: an MR control system comprising one or more processors and instructions stored in one or more memories of the MR control system, that, when executed, cause the one or more processors of the MR control system to: obtain sensor data representative of sensor output from a semiconductor manufacturing tool; determine operational information associated with the semiconductor manufacturing tool and based, at least in part, on the sensor data; and cause, responsive to a wireless communication channel being established with an MR headset, the operational information associated with the semiconductor manufacturing tool to be transmitted to the MR headset via the wireless communication channel; and the MR headset comprising one or more processors and instructions stored in one or more memories of the MR headset, that, when executed, cause the one or more processors of the MR headset to: establish the wireless communication channel with the MR control system; receive the operational information associated with the semiconductor manufacturing tool from the MR control system; and cause content associated with the operational information and one or more control features to be rendered in an MR environment.

In some embodiments, the instructions stored in the one or more memories of the MR headset, when executed, further cause the one or more processors of the MR headset to establish the wireless communication channel by: identifying a wireless access point associated with the MR control system and a password associated with the wireless access point; and connecting to the wireless access point using the password.

In some embodiments, the instructions stored in the one or more memories of the MR headset, when executed, further cause the one or more processors of the MR headset to identify the wireless access point by: obtaining image data via a camera associated with the MR headset; identifying a machine-readable code in the image data; decoding the machine-readable code to retrieve encrypted information; and decrypting the encrypted information using key information stored on the memory of the MR headset, wherein the decrypted information includes an identifier of the wireless access point and the password.

In some embodiments, the rendered content comprises a user interface element that indicates a sensor value included in the sensor data obtained by the MR control system.

In some embodiments, the instructions stored in the one or more memories of the MR headset, when executed, further cause the one or more processors of the MR headset to: receive a user input that indicates that the user interface element is to be fixed at a spatial coordinate with respect to the semiconductor manufacturing tool; identify a group of spatial coordinates in a coordinate system that is fixed with respect to the semiconductor manufacturing tool, wherein the group of spatial coordinates indicate borders of the user interface element with respect to a fixed spatial coordinate; identify a physical position and an orientation of the MR headset relative to the coordinate system; and modify presentation of the user interface element based on the physical position and the orientation of the MR headset relative to the fixed spatial coordinate.

In some embodiments, the instructions stored in the one or more memories of the MR headset, when executed, further cause the one or more processors of the MR headset to identify a physical position and an orientation of the MR headset, wherein the content is rendered based on the physical position and the orientation of the MR headset. In some embodiments, the physical position and the orientation of the MR headset are identified with respect to the semiconductor manufacturing tool.

In some embodiments, the operational information comprises positions of one or more internal elements of the semiconductor manufacturing tool, wherein the rendered content comprises three-dimensional representations of the positions of the one or more internal elements of the semiconductor manufacturing tool over time, and wherein the three-dimensional representations of the positions of the one or more internal elements of the semiconductor manufacturing tool are rendered based on a physical position and orientation of the MR headset relative to the semiconductor manufacturing tool.

In some embodiments, the instructions stored in the one or more memories of the MR control system, when executed, further cause the one or more processors of the MR control system to transmit three-dimensional model information associated with the semiconductor manufacturing tool to the MR headset; and the instructions stored in the one or more memories of the MR headset, when executed, further cause the one or more processors of the MR headset to receive and render the three-dimensional model information, wherein the three-dimensional representations of the positions of the one or more internal elements are rendered based on the three-dimensional model information relative to the semiconductor manufacturing tool. In some embodiments, the one or more internal elements include at least one of: a wafer support, a showerhead, one or more lift pins, one or more wafers, one or more slit valves, a robotic arm, an indexer, a carousel, or any combination of two or more thereof.

In some embodiments, the instructions stored in the one or more memories of the MR headset, when executed, further cause the one or more processors of the MR headset to: receive one or more input signals associated with an operational instruction for the semiconductor manufacturing tool; and cause, responsive to receiving the one or more input signals, the operational instruction to be transmitted the MR control system; wherein the instructions stored in the one or more memories of the MR control system, when executed, further cause the one or more processors of the MR control system to: receive the operational instruction from the MR headset; and cause a command to change a state of the semiconductor manufacturing tool or of a digital twin that represents the semiconductor manufacturing tool to be transmitted via a communications interface configured to be communicably connected with the semiconductor manufacturing tool.

In some embodiments, the sensor data comprises virtual sensor data generated by the digital twin, and wherein the instructions stored in the memory of the MR control system cause the one or more processors of the MR control system to receive the virtual sensor data from the digital twin. In some embodiments, the instructions stored in the one or more memories of the MR control system, when executed, further cause the one or more processors of the MR control system to transmit three-dimensional model information associated with the semiconductor manufacturing tool to the MR headset; and the instructions stored in the one or more memories of the MR headset, when executed, further cause the one or more processors of the MR headset to render the content based on an orientation of the MR headset and based on the three-dimensional model information, wherein the rendered content comprises content indicating a state of the digital twin. In some embodiments, the instructions stored in the one or more memories of the MR headset, when executed, further cause the one or more processors of the MR headset to: identify an updated orientation of the MR headset; and update the rendered content based on the updated orientation of the MR headset.

In some embodiments, the instructions stored in the one or more memories of the MR headset further cause the one or more processors of the MR headset to: receive an input that indicates second operational information associated with the semiconductor manufacturing tool, wherein the second operational information is different at least in part from the operational information; cause a request for the second operational information to be transmitted to the MR control system; and cause second content associated with the second operational information to be rendered responsive to receiving the second operational information from the MR control system; and the instructions stored in the one or more memories of the MR control system further cause the one or more processors of the MR control system to: receive the request for the second operational information; and cause the second operational information to be transmitted to the MR headset responsive to receiving the request.

In accordance with some embodiments, an MR headset configured to control a semiconductor manufacturing tool in an MR environment is provided. In some embodiments, the MR headset comprises: one or more processors; a display coupled to the one or more processors; one or more cameras; and one or more memories storing computer-executable instructions which, when executed, cause the one or more processors to: establish a wireless communication channel with an MR control system of a semiconductor manufacturing tool; receive operational information associated with the semiconductor manufacturing tool from the MR control system; and cause content associated with the operational information and one or more control features to be rendered in an MR environment.

In some embodiments, the instructions, when executed, further cause the one or more processors to initiate the establishment of the wireless communication channel by: identifying a wireless access point associated with the MR control system and a password associated with the wireless access point; and connecting to the wireless access point using the password. In some embodiments, the instructions, when executed, further cause the one or more processors to identify the wireless access point by: obtaining image data via a camera of the one or more cameras; identifying a machine-readable code in the image data; decoding the machine-readable code to retrieve encrypted information; and decrypting the encrypted information using key information stored in the memory, wherein the decrypted information includes an identifier of the wireless access point and the password.

In some embodiments, the instructions, when executed, further cause the one or more processors to identify a physical position and an orientation of the MR headset based on data from one or more sensors of the MR headset, wherein the content is rendered from a perspective that is based on the identified physical position and orientation of the MR headset.

In some embodiments, the instructions, when executed, further cause the one or more processors to: receive an input that indicates second operational information associated with the semiconductor manufacturing tool, wherein the second operational information is different at least in part from the operational information; and cause a request for the second operational information to be transmitted to the MR control system; receive the second operational information from the MR control system; and cause second content associated with the second operational information to be rendered. In some embodiments, the input that indicates the second operational information indicates a selection of a selectable input included in a menu rendered by the MR headset. In some embodiments, the input that indicates the second operational information is generated based on an image capture of a machine-readable code that identifies the second operational information. In some embodiments, the rendered content comprises a user interface element that presents sensor data obtained from one or more sensors of the semiconductor manufacturing tool, and wherein the sensor data corresponds to the requested second operational information. In some embodiments, the instructions, when executed, further cause the one or more processors to: receive a second input that indicates that the user interface element is to be fixed at a spatial coordinate with respect to the semiconductor manufacturing tool; identify a group of spatial coordinates in a coordinate system that is fixed with respect to the semiconductor manufacturing tool, wherein the group of spatial coordinates indicate borders of the user interface element with respect to a fixed spatial coordinate; identify a physical position and an orientation of the MR headset relative to the coordinate system; and modify presentation of the user interface element based on the physical position and orientation of the MR headset relative to the fixed spatial coordinate.

In some embodiments, the instructions, when executed, further cause the one or more processors to: receive three-dimensional model information associated with the semiconductor manufacturing tool as part of the operational information; identify a physical position and orientation of the MR headset relative to the semiconductor manufacturing tool; and cause a three-dimensional representation of one or more elements of the semiconductor manufacturing tool to be rendered based on: 1) the three-dimensional model information and 2) the physical position and orientation of the MR headset relative to the semiconductor manufacturing tool as part of the rendered content associated with the operational information in the MR environment. In some embodiments, the operational information comprises positions of one or more internal elements of the semiconductor manufacturing tool over time, and wherein the rendered content comprises representations of the positions of the one or more internal elements of the semiconductor manufacturing tool over time relative to the semiconductor manufacturing tool. In some embodiments, the one or more internal elements include at least one of: a wafer support, a showerhead, one or more lift pins, one or more wafers, one or more slit valves, a robotic arm, an indexer, or a carousel. In some embodiments, the instructions, when executed, further cause the one or more processors to render the content by: generating one or more three-dimensional images representing the one or more internal elements using the three-dimensional model information; and causing the one or more three-dimensional images to be rendered by the MR headset based on the positions of the one or more internal elements relative to the semiconductor manufacturing tool.

In some embodiments, the instructions, when executed further cause the one or more processors to: receive three-dimensional model information associated with the semiconductor manufacturing tool as part of the operational information; and cause the content to be rendered based on the three-dimensional model information, wherein the rendered content comprises content indicative of a state of a component a digital twin represented by the three-dimensional model information, wherein the digital twin represents the semiconductor manufacturing tool.

In accordance with some embodiments, an MR control system is provided. In some embodiments, the MR control system comprises: one or more processors; one or more memory devices storing computer-executable instructions which, when executed, cause the one or more processors to: establish a wireless communication channel with an MR headset; obtain sensor data representative of sensor output from a semiconductor manufacturing tool; determine operational information of the semiconductor manufacturing tool based on the sensor data; and cause the operational information to be transmitted to the MR headset via the communication channel.

In some embodiments, the MR control system is in communication with a digital twin, and wherein the sensor data comprises virtual sensor data obtained from the digital twin. In some embodiments, wherein the operational information comprises an indication of a state of the digital twin. In some embodiments, the instructions further cause the one or more processors to transmit three-dimensional model information associated with at least a portion of the semiconductor manufacturing tool to the MR headset, wherein the MR headset renders content indicating the state of the digital twin based on the three-dimensional model information.

In some embodiments, the MR control system is in communication with the semiconductor manufacturing tool, and wherein the sensor data comprises sensor data obtained from one or more physical sensors of the semiconductor manufacturing tool. In some embodiments, the operational information comprises a state of the semiconductor manufacturing tool.

In some embodiments, the instructions, when executed, further cause the one or more processors to determine positions of one or more internal elements of the semiconductor manufacturing tool over time, wherein the operational information comprises information indicating the positions of the one or more internal elements of the semiconductor manufacturing tool over time relative to the semiconductor manufacturing tool. In some embodiments, the instructions, when executed, further cause the one or more processors to transmit three-dimensional model information associated with at least a portion of the semiconductor manufacturing tool including at least one of the one or more internal elements, wherein the three-dimensional model information is used by MR headset to render representations of the one or more internal elements based on the three-dimensional model information.

In some embodiments, the instructions, when executed, further cause the one or more processors to: receive, from the MR headset, a request for second operational information that is at least different in part from the operational information; and cause the requested second operational information to be transmitted to the MR headset.

In accordance with some embodiments, a method for controlling a semiconductor manufacturing tool via an MR session is provided, the method comprising: establishing, by an MR headset, a wireless communication channel with an MR control system; obtaining, by the MR control system, sensor data representative of sensor output from a semiconductor manufacturing tool; determining, by the MR control system, operational information associated with the semiconductor manufacturing tool and based, at least in part, on the sensor data; transmitting, by the MR control system and responsive to a wireless communication channel being established with an MR headset, the operational information associated with the semiconductor manufacturing tool to the MR headset via the communication channel; receiving, by the MR headset, the operational information associated with the semiconductor manufacturing tool from the MR control system; and rendering, by the MR headset, content associated with the operational information and one or more control features in an MR environment.

In some embodiments, the method further comprises, identifying, by the MR headset, a wireless access point associated with the MR control system and a password associated with the wireless access point; and connecting to the wireless access point using the password. In some embodiments, the method further comprises: obtaining image data via a camera associated with the MR headset; identifying a machine-readable code in the image data; decoding the machine-readable code to retrieve encrypted information; and decrypting the encrypted information using key information stored on the memory of the MR headset, wherein the decrypted information includes an identifier of the wireless access point and the password.

In some embodiments, the rendered content comprises a user interface element that indicates a sensor value included in the sensor data obtained by the MR control system. In some embodiments, the method further comprises: receiving, by the MR headset, a user input that indicates that the user interface element is to be fixed at a spatial coordinate with respect to the semiconductor manufacturing tool; identifying a group of spatial coordinates in a coordinate system that is fixed with respect to the semiconductor manufacturing tool, wherein the group of spatial coordinates indicate borders of the user interface element with respect to a fixed spatial coordinate; identifying a physical position and an orientation of the MR headset relative to the coordinate system; and modifying presentation of the user interface element based on the physical position and the orientation of the MR headset relative to the fixed spatial coordinate.

In some embodiments, the method further comprises identifying a physical position and an orientation of the MR headset, wherein the content is rendered based on the physical position and the orientation of the MR headset. In some embodiments, the physical position and the orientation of the MR headset are identified with respect to the semiconductor manufacturing tool.

In some embodiments, the operational information comprises positions of one or more internal elements of the semiconductor manufacturing tool, wherein the rendered content comprises three-dimensional representations of the positions of the one or more internal elements of the semiconductor manufacturing tool over time, and wherein the three-dimensional representations of the positions of the one or more internal elements of the semiconductor manufacturing tool are rendered based on a physical position and orientation of the MR headset relative to the semiconductor manufacturing tool. In some embodiments, the method further comprises: transmitting, by the MR control system, three-dimensional model information associated with the semiconductor manufacturing tool as part of the operational information; and receiving, by the MR headset, the three-dimensional model information, wherein the three-dimensional representations of the positions of the one or more internal elements are rendered based on the three-dimensional model information relative to the semiconductor manufacturing tool. In some embodiments, the one or more internal elements include at least one of: a wafer support, a showerhead, one or more lift pins, one or more wafers, one or more slit valves, a robotic arm, an indexer, or a carousel.

In some embodiments, the method further comprises: receiving, by the MR headset, one or more input signals associated with an operational instruction for the semiconductor manufacturing tool; transmitting, responsive to receiving the one or more input signals, the operational instruction to the MR control system; receiving, by the MR control system, the operational instruction from the MR headset; and transmitting, by the MR control system, a command to change a state of the semiconductor manufacturing tool or of a digital twin that represents the semiconductor manufacturing tool via a communications interface configured to be communicably connected with the semiconductor manufacturing tool.

In some embodiments, the sensor data comprises virtual sensor data generated by the digital twin, and wherein the instructions stored in the memory of the MR control system cause the one or more processors of the MR control system to receive the virtual sensor data from the digital twin. In some embodiments, the method further comprises: transmitting, by the MR control system, three-dimensional model information associated with the semiconductor manufacturing tool to the MR headset; and causing the content to be rendered by the MR headset based on an orientation of the MR headset and based on the three-dimensional model information, wherein the rendered content comprises content indicating a state of the digital twin. In some embodiments, the method further comprises: identifying an updated orientation of the MR headset; and updating the rendered content based on the updated orientation of the MR headset.

In some embodiments, the method further comprises: receiving, by the MR headset, an input that indicates second operational information associated with the semiconductor manufacturing tool, wherein the second operational information is different at least in part from the operational information; transmitting, by the MR headset, a request for the second operational information to the MR control system; receiving, by the MR control system, the request for the second operational information; transmitting, by the MR control system, the second operational information to the MR headset responsive to receiving the request; and rendering, by the MR headset, second content associated with the second operational information responsive to receiving the second operational information from the MR control system.

In accordance with some embodiments, one or more non-transitory computer-readable media including instructions that, when executed by one or more processors, cause the one or more processors to perform a method for controlling a semiconductor manufacturing tool via an MR session are provided. In some embodiments, the method comprises: establishing, by an MR headset, a wireless communication channel with an MR control system, obtaining, by the MR control system, sensor data representative of sensor output from a semiconductor manufacturing tool; determining, by the MR control system, operational information associated with the semiconductor manufacturing tool and based, at least in part, on the sensor data; transmitting, by the MR control system and responsive to a wireless communication channel being established with an MR headset, the operational information associated with the semiconductor manufacturing tool to the MR headset via the communication channel; receiving, by the MR headset, the operational information associated with the semiconductor manufacturing tool from the MR control system; and rendering, by the MR headset, content associated with the operational information and one or more control features in an MR environment.

In some embodiments, the method further comprises: identifying, by the MR headset, a wireless access point associated with the MR control system and a password associated with the wireless access point; and connecting to the wireless access point using the password. In some embodiments, the method further comprises: obtaining image data via a camera associated with the MR headset; identifying a machine-readable code in the image data; decoding the machine-readable code to retrieve encrypted information; and decrypting the encrypted information using key information stored on the memory of the MR headset, wherein the decrypted information includes an identifier of the wireless access point and the password.

In some embodiments, the rendered content comprises a user interface element that indicates a sensor value included in the sensor data obtained by the MR control system. In some embodiments, the method further comprises; receiving, by the MR headset a user input that indicates that the user interface element is to be fixed at a spatial coordinate with respect to the semiconductor manufacturing tool; identifying a group of spatial coordinates in a coordinate system that is fixed with respect to the semiconductor manufacturing tool, wherein the group of spatial coordinates indicate borders of the user interface element with respect to a fixed spatial coordinate; identifying a physical position and an orientation of the MR headset relative to the coordinate system; and modifying presentation of the user interface element based on the physical position and the orientation of the MR headset relative to the fixed spatial coordinate.

In some embodiments, the method further comprises: identifying a physical position and an orientation of the MR headset, wherein the content is rendered based on the physical position and the orientation of the MR headset. In some embodiments, the physical position and the orientation of the MR headset are identified with respect to the semiconductor manufacturing tool.

In some embodiments, the operational information comprises positions of one or more internal elements of the semiconductor manufacturing tool, wherein the rendered content comprises three-dimensional representations of the positions of the one or more internal elements of the semiconductor manufacturing tool over time, and wherein the three-dimensional representations of the positions of the one or more internal elements of the semiconductor manufacturing tool are rendered based on a physical position and orientation of the MR headset relative to the semiconductor manufacturing tool. In some embodiments, the method further comprises: transmitting, by the MR control system, three-dimensional model information associated with the semiconductor manufacturing tool as part of the operational information; and receiving, by the MR headset, the three-dimensional model information, wherein the three-dimensional representations of the positions of the one or more internal elements are rendered based on the three-dimensional model information relative to the semiconductor manufacturing tool. In some embodiments, the one or more internal elements include at least one of: a wafer support, a showerhead, one or more lift pins, one or more wafers, one or more slit valves, a robotic arm, an indexer, or a carousel.

In some embodiments, the method further comprises: receiving, by the MR headset, one or more input signals associated with an operational instruction for the semiconductor manufacturing tool; transmitting, responsive to receiving the one or more input signals, the operational instruction to the MR control system; receiving, by the MR control system, the operational instruction from the MR headset; and transmitting, by the MR control system, a command to change a state of the semiconductor manufacturing tool or of a digital twin that represents the semiconductor manufacturing tool via a communications interface configured to be communicably connected with the semiconductor manufacturing tool.

In some embodiments, the sensor data comprises virtual sensor data generated by the digital twin, and wherein the instructions stored in the memory of the MR control system cause the one or more processors of the MR control system to receive the virtual sensor data from the digital twin. In some embodiments, the method further comprises: transmitting, by the MR control system, three-dimensional model information associated with the semiconductor manufacturing tool to the MR headset; and causing the content to be rendered by the MR headset based on an orientation of the MR headset and based on the three-dimensional model information, wherein the rendered content comprises content indicating a state of the digital twin. In some embodiments, the method further comprises: identifying an updated orientation of the MR headset; and updating the rendered content based on the updated orientation of the MR headset.

In some embodiments, the method further comprises: receiving, by the MR headset, an input that indicates second operational information associated with the semiconductor manufacturing tool, wherein the second operational information is different at least in part from the operational information; transmitting, by the MR headset, a request for the second operational information to the MR control system; receiving, by the MR control system, the request for the second operational information; transmitting, by the MR control system, the second operational information to the MR headset responsive to receiving the request; and rendering, by the MR headset, second content associated with the second operational information responsive to receiving the second operational information from the MR control system.

DETAILED DESCRIPTION

Overview

Figure 1A:
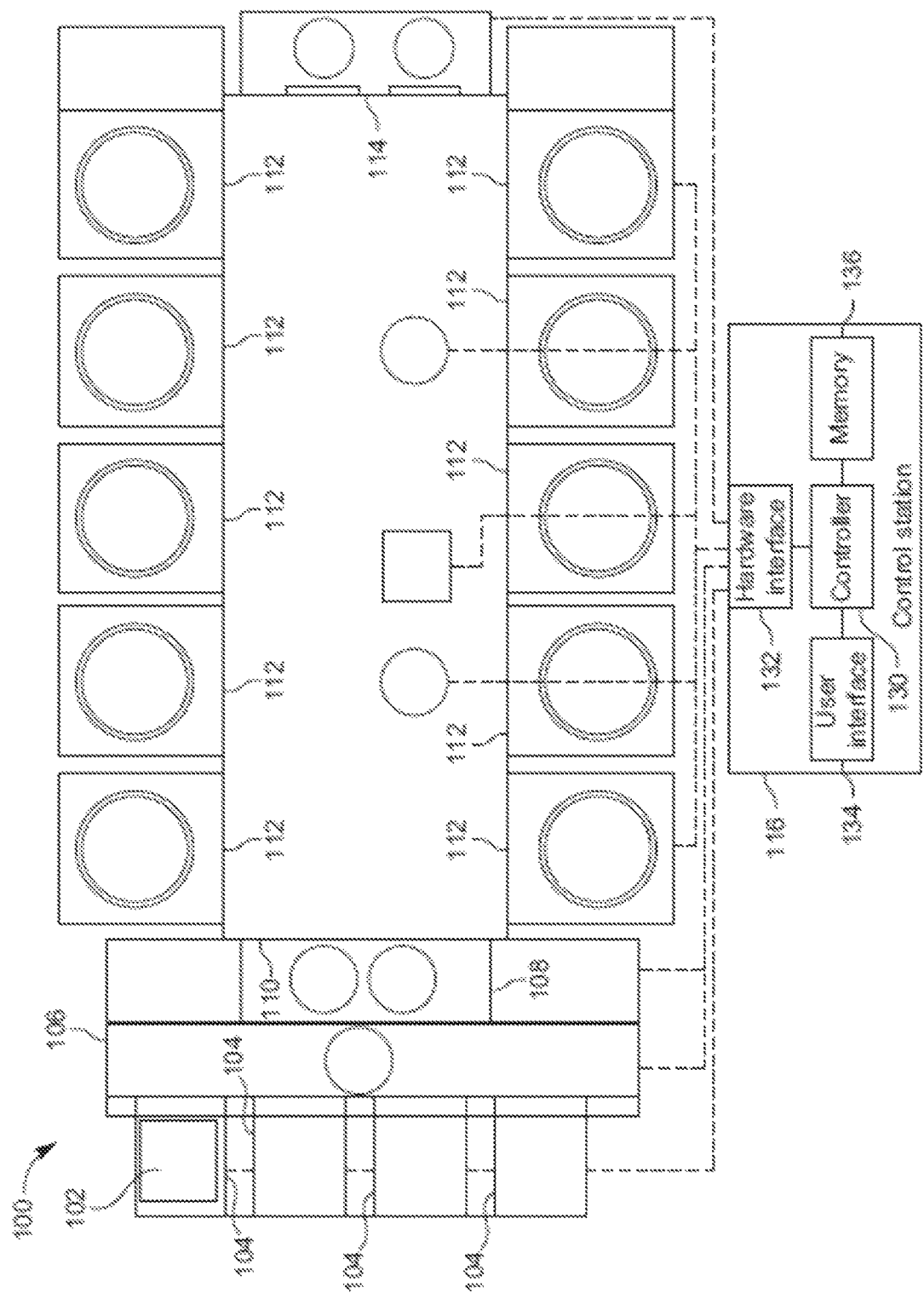
FIGS. 1A and 1B show schematic diagrams of top and perspective views, respectively, of components of a semiconductor manufacturing tool in accordance with some embodiments.

Systems, methods, and non-transitory computer readable media for controlling semiconductor manufacturing tools in an MR environment are provided.

Semiconductor manufacturing equipment is very complex, and may also be physically large and/or may include opaque walls, which may make it difficult to determine a state of the equipment from visual inspection. Status information associated with operation of semiconductor manufacturing equipment (e.g., a current operational status, current sensor values, etc.) may generally be presented on a display screen, such as a display screen attached to the semiconductor manufacturing equipment. However, due to the size of semiconductor manufacturing equipment, it may be difficult for an operator (e.g., a process engineer, a person charged with equipment maintenance, etc.) to view/access such a display screen while also looking at or interacting with various portions of the semiconductor manufacturing equipment that are not in a close proximity to the display screen. For example, in an instance in which a display screen is mounted to a frontal portion of the semiconductor manufacturing equipment, the display screen would not be visible to the operator when the operator moves to the back of the tool to perform maintenance.

According to some embodiments of the present disclosure, a Mixed Reality (MR) rendering device, such as an MR headset, can be used to render information associated with a semiconductor manufacturing tool and to enable an operator to control such tool. The semiconductor manufacturing tool may be large in size or dimensions and may include multiple components. Portions of the semiconductor manufacturing tool may have opaque walls. For example, a semiconductor manufacturing tool may include one or more process chambers in which wafers undergo processing. Accordingly, it may be difficult to determine operational information associated with the semiconductor manufacturing tool, such as positions of various internal elements of the semiconductor manufacturing tool, current sensor data associated with sensor outputs of the semiconductor manufacturing tool, or the like. By rendering such operational information and device control user interfaces in an MR environment, the MR headset enables an operator (e.g., a process engineer, a technician, or other user) to conveniently view the operational information and control the semiconductor manufacturing tool.

For example, in some embodiments operational information, such as indications of current sensor values, may be displayed in an MR environment such that an operator wearing the MR headset can view the current sensor values, interact with a control system for the semiconductor manufacturing tool, etc., while inspecting the semiconductor manufacturing tool from different sides. As another example, in some embodiments, three-dimensional representations of internal elements of the semiconductor manufacturing tool may be rendered by an MR headset based on a position or orientation of the MR headset to the semiconductor manufacturing tool, thereby allowing the operator to look inside the semiconductor manufacturing tool. By rendering operational information in an MR environment, the systems, methods, and computer products described herein may improve operation of a semiconductor manufacturing tool by reducing repair times, reducing tool down time, improving access to sensor data, or the like.

Displaying equipment information and enabling system control in a mobile MR environment provide technical advantages and solutions that cannot be achieved by conventional semiconductor control platforms. A conventional semiconductor manufacturing tool's control platform is often linked to just one tool, where the control platform is either displayed on a single monitor attached to the tool, or in some instances, transmitted to a remote display such as a service tablet. The amount of information and control that can be displayed at any given time is often limited to the screen size and resolution. This means when an operator is accessing a tool via a conventional control platform, he or she will only be able to assess a subset of information and control function per screen. This limitation makes holistic tool diagnostics very difficult and inefficient. An operator examining multiple components in a tool would need to keep on entering and leaving multiple functional tabs while memorizing the data in every tab. Moreover, even when the information is transmitted to a remote display, the information is not location specific. For example, an operator standing at the back side of a tool would still be viewing the control panel for the whole system instead of a control panel relevant to the component in front of him/her. Moreover, the graphical user interface (GUI) of conventional control platforms is not programmed to allow situation-based user customization. That is, operators often cannot customize the display on the screen to only present information and controls relevant to a set of subcomponents they deemed relevant. Moreover, even if some customization is allowed, such a feature would be restricted by the display interface. That is, at a designated screen location, only a set of GUI elements can be changed. Furthermore, conventional control platforms lack the ability to render and animate internal components in three-dimensional (3D) graphics, which would help operators visualize system issues holistically by accounting for the activities of neighboring components along with the information associated with the component of interest.

Embodiments of the present disclosure improve the control platform of semiconductor manufacturing tool by providing an unrestricted display and control environment and introducing fully customizable control mechanisms to allow operators to generate situation-based control GUI. Further, embodiments of the present disclosure enable one device (e.g., MR headset) to view and control subcomponents of multiple tools simultaneously. Embodiments of the present disclosure also enable component specific information and control to be accessed from different sides of a tool. For example, when a user is looking at a process chamber, embodiments of the present disclosure would display all relevant tool information and control associated with that process chamber. These are just a few examples. Other advantages and technical improvements are further described in various embodiments of the present disclosure.

FIG. 1A shows a schematic diagram a top view of components of an example semiconductor manufacturing tool 100 in accordance with some embodiments.

Semiconductor manufacturing tool 100 includes load ports 104. Load ports 104 are a platform or receiver that receives Front Opening Unified Pods (FOUPs), such as FOUPs 102. The FOUPs may contain wafers (e.g., 20 wafers, 25 wafers, 30 wafers, or the like). The wafers may be arranged in a stack within the FOUP. In some embodiments, each wafer in a FOUP may rest on a separate ledge extending inward from walls of the FOUP. A FOUP may be a plastic container (e.g., an injection-molded plastic container, or the like).

Each FOUP may have a door or other opening that is placed against an Equipment Front End Module (EFEM)

106. EFEM 106 may have a corresponding door that allows wafers to be passed into EFEM 106 from a FOUP. FOUPs may dock to EFEM 106 via load ports 104. EFEM 106 may include one or more wafer handling robots. In some embodiments, EFEM 106 may be an enclosed volume such that internal elements of EFEM 106 (e.g., one or more wafer handling robots) are not visible from outside EFEM 106.

Semiconductor manufacturing tool 100 includes a load lock 108 (e.g., an airlock) for transferring wafers in an out of a vacuum transfer module (VTM) 110. Vacuum transfer module 110 may be a large chamber that is connected to one or more process chambers (e.g., process chambers 112). Vacuum transfer module 110 may also be connected to load lock 108 and a buffer station 114. Vacuum transfer module 110 may be held at a sub-atmospheric pressure, i.e., a vacuum, such that the process chambers 112 can also be held at sub-atmospheric pressure and wafers can be passed therebetween through the vacuum transfer module without needing to increase or decrease a pressure of the process chambers 112.

As illustrated in FIG. 1, semiconductor manufacturing tool 100 includes ten process chambers in process chambers 112 arranged in a rectangle. However, it should be noted that the number of process chambers and the arrange of the process chambers in FIG. 1 is merely shown as an illustrative example, and semiconductor manufacturing tool 100 may include more or fewer process chambers, which may be arranged in various configurations (e.g., a square, a hexagon, or the like). In some embodiments, the processing chambers 112 may include an inductive coupled plasma (ICP) chamber or a conductive coupled plasma (CCP) chamber. The processing chamber 112 may, for example, perform conductive etch or dielectric etch processes.

Although not shown in FIG. 1, various components or elements may be located underneath or otherwise in proximity to each process chamber, such as pumps, vacuum lines, exhaust lines, a vertical lift actuator for moving a pedestal inside the process chamber up and down, or the like.

Buffer station 114 is a temporary storage space for wafers within vacuum transfer module 110. For example, wafers may be stored in buffer station 114 in between transfer to different process chambers of process chambers 112. In some embodiments, buffer station 114 may have heating and/or cooling capabilities.

In some embodiments, semiconductor manufacturing tool 100 includes a control station 116 for controlling states of semiconductor manufacturing tool 100, initiating or changing a process implemented by semiconductor manufacturing tool 100, or the like. Control station 116 may include a controller 130, a hardware interface 132, a user interface 134, and/or a memory 136. In some embodiments, controller 130 may transmit commands to semiconductor manufacturing tool 100 via hardware interface 132. In some embodiments, commands may be received by controller 130 via user interface 134. In some embodiments, the controller 130 is a general-purpose computer/processor. In some embodiments, the controller 130 is a special-purpose computer/processor configured to interact with or command a specific set of sensors and programs within the semiconductor manufacturing tool 100. In some embodiments, control station 116 may interface with an MR control system as described herein.

Figure 1B:
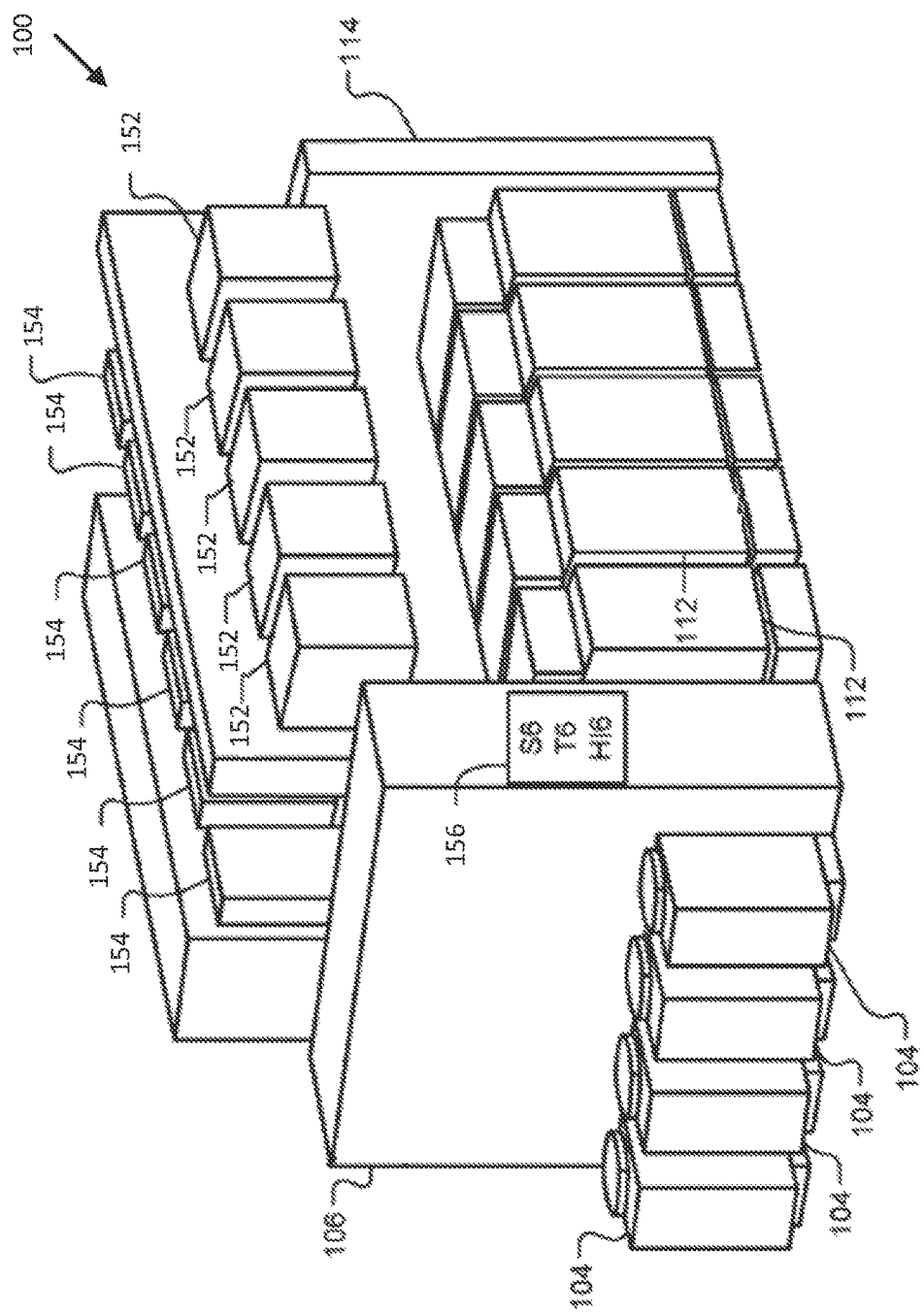

FIG. 1B shows a schematic diagram a perspective view of components of semiconductor manufacturing tool 100 in accordance with some embodiments.

As illustrated, semiconductor manufacturing tool 100 includes gas boxes 152. Gas boxes 152 may include various components, such as valves, tubing, mass flow controllers, etc. for delivering process gases to process chambers 112. Gas boxes 152 may additionally include radio frequency generators and/or remote plasma generators.

Semiconductor manufacturing tool 100 includes lift boxes 154. Lift boxes 154 may be used to lift and/or lower gas boxes 152, for example, to move gas boxes 152 closer and/or further from process chambers 112.

Various sensors associated with semiconductor manufacturing tool (e.g., temperature sensors, pressure sensors, position sensors, motion sensors, etc.) may be used to collect sensor data 156 associated with semiconductor manufacturing tool. Sensor data 156 may include time series data collected at any suitable frequency. Sensor data 156 may include an aggregation of data from multiple types of sensors and sensors placed at multiple locations or positions of semiconductor manufacturing tool 100.

Figure 2:
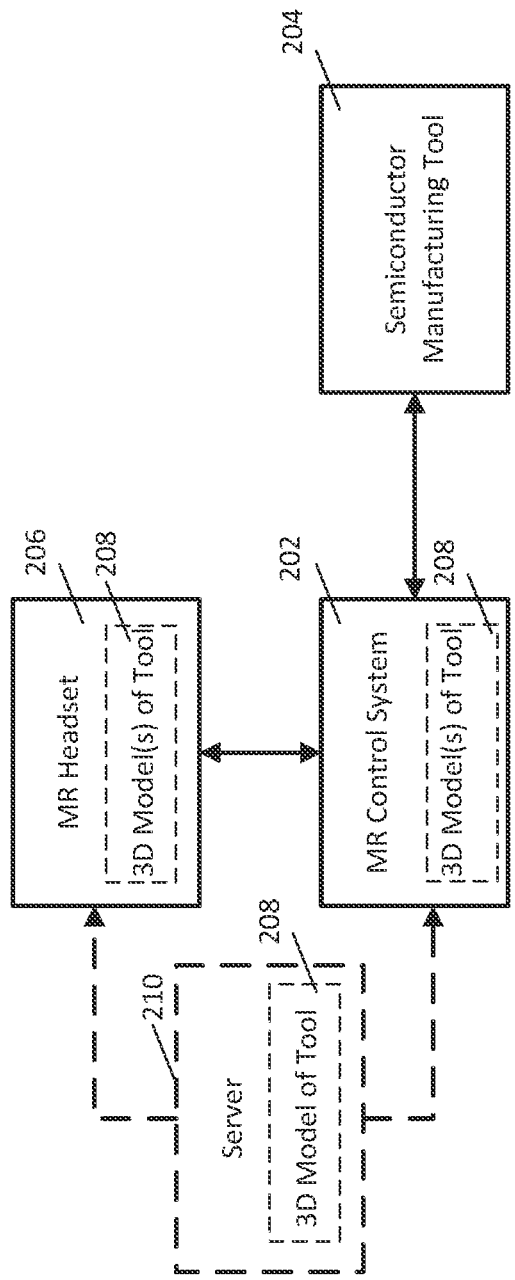
FIG. 2 shows an example schematic diagram of an MR control platform for controlling semiconductor manufacturing tools using an MR rendering device such as an MR headset in accordance with some embodiments.

FIG. 2 illustrates an example schematic diagram of MR control platform for controlling a semiconductor manufacturing tool using an MR rendering device such as an MR headset in accordance with some embodiments.

As illustrated, an MR control system 202 is in communication with a semiconductor manufacturing tool 204. Communication between MR control system 202 and semiconductor manufacturing tool 204 may use a Transmission Control Protocol (TCP)-based protocol, an Internet Protocol (IP)-based protocol, etc. The communication may be wired or wireless. In some embodiments, the MR control system is in direct communication with a control system of the semiconductor manufacturing tool, such as controller 130 as shown in FIG. 1A. In some embodiments, the MR control system is in direct communication with various components within the semiconductor manufacturing tool via a hardware interface, such as hardware interface 132 as shown in FIG. 1A.

MR control system 202 can be configured to execute semiconductor tool control software that provides instructions to semiconductor manufacturing tool 204 that cause semiconductor manufacturing tool 204 to perform various operations. For example, referring to FIG. 1A, MR control system 202 can transmit instructions to controller 130 of semiconductor manufacturing tool 100. These operations can include initiating a particular fabrication process or operation, setting or modifying various setpoints, moving a particular moveable component (e.g., a robotic arm, a showerhead, an indexer, a carousel, a pedestal, etc.), moving a wafer, and the like. In some embodiments, MR control system 202 can receive operational information from semiconductor manufacturing tool 204. For example, the MR control system 202 can receive information that indicates sensor values of one or more sensors associated with semiconductor manufacturing tool 204, state information or position information associated with various components of semiconductor manufacturing tool 204, and the like.

MR control system 202 is in communication with an MR headset 206. In some embodiments, MR control system 202 is configured to transmit operational information via an established wireless communication channel to MR headset 206.

In some embodiments, MR headset 206 can transmit messages/commands to MR control system 202. For example, in some embodiments, MR headset 206 can transmit messages that include operational instructions that are to be transmitted to semiconductor manufacturing tool 204 via MR control system 202. The structure of the MR headset 206 is not limited to a head mount gear. The MR headset 206 may be MR projecting glasses or a wearable MR projection device that can cast/project images to a display surface at a particular distance to an operator.

In some embodiments, one or more three-dimensional (3D) models 208 of semiconductor manufacturing tool 204 is used to render content that is then displayed using the MR headset 206. In some embodiments, three-dimensional model 208 can include three-dimensional modeling information of various components or internal elements of semiconductor manufacturing tool 204. The 3D modeling information may include, but is not limited to, spatial coordinates, spatial relationships, object modeling geometry (i.e. polygons and their vertices), shaders, object-specific rendering algorithm, clipping, and texture filters, etc. Example components or internal elements may include robotic arms (including subassemblies thereof), lift pins, slit valves, showerheads, wafer supports (e.g., a pedestal, a chuck, etc.), indexers, carousels, external walls of process chamber, and the like. Additionally, three-dimensional model 208 may include three-dimensional modeling information associated with wafers undergoing processing, e.g., models of the wafers. In some embodiments, three-dimensional model 208 can be formatted based on Computer-Aided Design (CAD) information (e.g., as OBJ format files, as FBX format files, etc.), and/or in other similar formats.

In some embodiments, three-dimensional model(s) 208 may be stored in memory of MR headset 206 and/or in memory of MR control system 202. Additionally or alternatively, in some embodiments, three-dimensional model(s) 208 may be stored on a server 210 that is configured to provide one or more of the three-dimensional model(s) 208 to MR headset 206 and/or MR control system 202 in response to a request. In some instances, it would be desirable to have the 3D model information for a specific tool stored in MR control system 202, so that any MR headset can directly obtain the 3D modeling information upon connecting with the MR control system 202. In some embodiments, the 3D models 208 may render objects in either two-dimensions (2D) or 3D depending on the object type. For instance, the 3D model 208 may render graphical user interface (GUI) elements and numerical data in 2D, while rendering physical features of internal components in 3D. Both 2D and 3D rendering can be displayed on a single screen.

Semiconductor manufacturing tool operational information rendered in an MR environment may be used for a variety of applications.

For example, as shown in and described below in connection with FIGS. 5A, 5B, and 6A-6E, user interface elements that indicate sensor data, operational states, etc. of a physical semiconductor manufacturing tool may be rendered in an MR environment such that the physical environment (which may include at least a portion of the physical semiconductor manufacturing tool) may be visible even during presentation of the user interface elements. Such rendering is sometimes called Augmented Reality rendering, or AR, where virtually rendered objects may graphically overlay or annotate a projection of a physical environment. In some embodiments, visibility of the graphical user interface (GUI) elements may be configured or modified. For example, a user interface element may be configured such that the user interface element remains visible in the MR environment even as a wearer of the MR headset moves around the physical environment by configuring the user interface element to be fixed at a position within a field of view of the MR headset. As another example, a user interface element may be configured such that a position of the user interface element is fixed at position with respect to the physical environment such that when the field of view (FOV) changes the user interface element or a portion of the user interface element can no longer be seen. For example, an operator may "fix" a GUI element in an MR environment to a component at the back of a tool. Such GUI element will disappear from the operator's FOV when the operator moves away from the back side of the tool (e.g., moves to the front of the tool). But when the operator moves to the back side again, the operator will be able to see the fixed GUI element again.

As another example, as shown in and as described below in connection with FIGS. 8A, 8B, 9A, and 9B, 3D images that represent internal elements of a semiconductor manufacturing tool may be rendered in an MR environment. Accordingly, the MR headset may render views that overlay the 3D images of those components such that the locations of the 3D representations of those components appear to be located in the same real-world locations that the corresponding physical counterparts are located in-even if the physical counterparts are not otherwise visible, e.g., because they are within a sealed chamber. Such presentations allow the wearer of the MR headset to, in effect, look inside a semiconductor manufacturing tool without physically opening the semiconductor manufacturing tool. The ability to render objects in a semiconductor fabrication process, such as positions of robotic arms within a semiconductor manufacturing tool, positions of wafers undergoing fabrication within the semiconductor manufacturing tool, and positions of showerheads within process chambers would help engineers perform more holistic diagnostics because the data are no longer isolated. Rather, they are displayed as a whole to include interactions with neighboring components.

MR Environments

Mixed Reality (MR) environments may generally refer to a visualization space in which digital objects and/or digital visualizations are presented or rendered. It should be understood that MR environment, as used herein, generally encompasses both Augmented Reality (AR) environments and Virtual Reality (VR) environments. In an AR environment, digital objects and/or digital visualizations may be presented such that they appear overlaid over a projection or view of an actual physical environment. By contrast, in a VR environment, digital objects and/or digital visualizations may be presented within an entirely virtual environment.

In some embodiments, an MR environment is realized via use of an MR headset. Examples of commercial MR headsets include, but not limited to, MICROSOFT HOLOLENS, SAMSUNG HMD ODYSSEY, MAGIC LEAP ONE, OCULUS RIFT, HTC VIVE, AND VALVE INDEX. However, it should be understood that embodiments of the present disclosure can be implemented on any suitable MR rendering device that is able to interact and/or communicate with a semiconductor manufacturing tool.

An MR headset may have various cameras and/or sensors that are configured to provide information useful for rendering an MR environment. For example, various cameras can be used to obtain images with different angles or fields of view (FOV) that can be used to determine an orientation of a wearer of the headset relative to other objects in physical space. As another example, various sensors (e.g., an accelerometer, a gyroscope, a proximity sensor, etc.) can be used to determine a position of the head of a wearer of the headset, a location of the wearer either relative to another object or a fixed frame of reference, a current motion of the wearer of the headset, etc. It should be understood that any suitable conventional techniques for identifying position and/or orientation information may be used in connection with the techniques described herein. Moreover, suitable Application Programming Interfaces (APIs) for changing a position of digital objects rendered by an MR headset based on a position and/or orientation of the MR headset may be used in connection with the techniques described herein. For example, certain headset specific APIs for resolving the headset's location (e.g., Location Solver API), for determining the headset's moving direction (e.g., Directional Solver API), and for capturing the headset's surrounding objects (e.g., Spatial Awareness Mesh API) can be integrated.

An MR headset may present user interface elements or other content that is described herein as "selectable." When rendered in an MR environment, such graphical user interface (GUI) elements or other content may be selected by a user pointing, tapping, moving, etc. a virtual object within the MR environment at which the selectable element or content was presented. In some embodiments, a user may interact with GUI elements via a handheld controller associated with the MR headset, eye tracking functionality (for example, a user's line-of-sight may be tracked by one or more cameras and if the user's gaze is directed at the location of a user interface element for a predetermined period of time, then the MR headset may determine that the user has selected that user interface element), or voice command.

Referring back to FIG. 2, at a high level, after MR headset 206 establishes a connection with the semiconductor manufacturing tool 204 via MR control system 202, MR headset 206 will render a GUI for controlling and displaying information associated with the semiconductor tool 204. In operation, an operator may view various information associated with the semiconductor manufacturing tool via MR headset 206 and issue commands to control various internal components such as robotic arms or gas boxes. In some embodiments, location specific information can be displayed automatically and the operator may modify and configure the GUI unrestricted by a single screen. In some embodiments, the MR control system 202 is integrated within the semiconductor manufacturing tool 204, which serves as one of the tool controller's functions. In some embodiments, the MR control system 202 is external to the tool's controller and communicates with the tool's controller via a wired connection or wirelessly. The MR headset 206 can be connected to the MR control system 202 (or directly to the tool's controller) via a wired connection or wirelessly.

Establishing Communication Channels Between an MR Headset and an MR Control System Before an MR headset can be used to receive operational information from a semiconductor manufacturing tool or provide operational instructions to the semiconductor manufacturing tool, the MR headset must first establish a communications channel with the semiconductor manufacturing tool. There may be many ways in which such a communications channel may be established, and this disclosure is not limited to any particular such technique.

Once a communication channel is established, messages/commands can be transmitted between the MR headset and the MR control system via the communication channel according to some embodiments. For example, such messages can include operational information transmitted from the MR control system to the MR headset. As another example, such messages can include messages transmitted from the MR headset to the MR control system corresponding to operational instructions to be transmitted from the MR control system to a physical semiconductor manufacturing tool or a digital twin. In general, a digital twin described herein is a virtual replica of a physical semiconductor manufacturing tool with similar controls and programs.

In some embodiments, an MR control system may have a wireless communications interface (e.g., WiFi, BLUETOOTH, and the like). In some embodiments, to operate in connection with the MR control system, an MR headset may require connection to a wireless access point used by the MR control system to provide the wireless network provided by the MR control system. In some embodiments, the MR control system does not broadcast the access point information, for example, to prevent a device that receives broadcast access point information from attempting to connect to the access point. In some embodiments, the MR control system encrypts the access point information, which may be retrieved by the MR headset, decrypted, and then used to connect to the access point.

For example, in some embodiments, encrypted access point information may be encoded within a machine-readable code. The MR headset can decode the machine-readable code and decrypt the encrypted information to obtain the access point information. In other words, in some embodiments, the MR headset may store a decryption key used to decrypt the encrypted information embedded in the machine-readable code. By encrypting the access point information in the machine-readable code and storing the decryption key in the MR headset, authentication attempts to the access point of devices other than the MR headset that scan the machine-readable code can be prevented.

The presentation of the machine-readable code can be either static or dynamic. Examples of machine-readable codes includes but not limited to Quick Response (QR) codes, MAXICODE codes, DATA MATRIX codes, Code 128 codes, and the like.

Figure 3A:
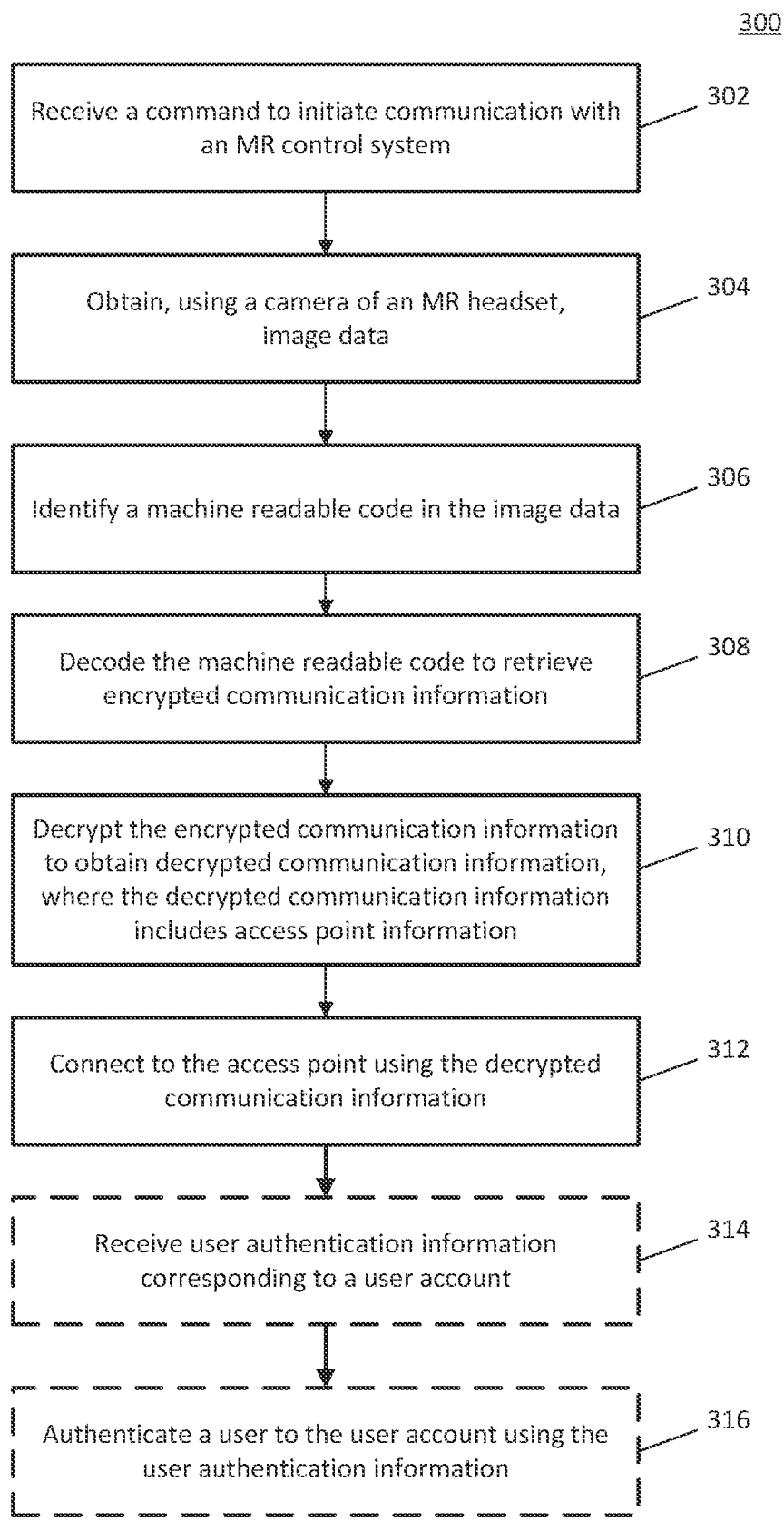
FIGS. 3A and 3B show flowcharts that illustrate example processes for establishing a communication channel between an MR headset and an MR control system.

FIG. 3A shows an example of a process 300 for establishing a communication channel between an MR headset and an MR control system. In some embodiments, blocks of process 300 may be executed by an MR headset. It should be noted that, in some embodiments, the blocks of process 300 shown in FIG. 3A can be performed in various orders and, in the case of two or more blocks are performed concurrently. Additionally, in some embodiments, one or more blocks of process 300 may be omitted.

At 302, the MR headset receives a command to initiate communication with an MR control system. The command may be received in any suitable manner. For example, the command may correspond to selection of or interaction with a user interface element, e.g., a "Connect" button control or menu item, rendered by the MR headset, detection of a particular spoken word comment via a microphone of the MR headset (e.g., "connect," etc.), detection of a particular gesture by a wearer of the MR headset, an image scan via the MR headset's camera, and the like. As another example, in some embodiments, the command may correspond to capture of a particular machine-readable code. In some embodiments, the particular machine-readable code may be attached to or displayed by a semiconductor manufacturing tool or a device communicating with the MR control system. In yet another example, the command may correspond to receipt of physical input by a button, switch, toggle, or other physical input device communicatively connected with, or part of, the MR headset.

At 304, the MR headset obtains image data using a camera of the MR headset. For example, the camera of the MR headset may be configured to capture the image data in response to receiving an instruction that the image data is to be captured. Such an instruction may be transmitted in response to receiving an explicit user input and/or in response to the MR headset determining that a machine-readable code is within a field of view of the camera.

At 306, the MR headset identifies a machine-readable code in the image data obtained at 304. For example, the MR headset may process the image data to identify one or more regions of an image that contain a machine-readable code. As another example, the MR headset may identify a portion of the image data (e.g., finder patterns within the image data, alignment patterns within the image data, etc.) that serves as a fiducial or fiducial marks to facilitate determining the orientation, position, and/or distance of the machine-readable code relative to the camera of the MR headset and decoding of the machine-readable code. In some embodiments, the location information of a particular machine-readable tag (either printed or rendered machine-readable code such as a QR code) is embedded within the machine-readable code. That is, upon scanning the machine-readable code, the scanning device (e.g., the MR headset), will be able to determine its location and orientation with respect to the semiconductor manufacturing tool. In some embodiments, the MR headset uses the tag's location information to determine its approximate location around the semiconductor manufacturing tool, and the use its camera to adjust the field of view's orientation.

At 308, the MR headset decodes the machine-readable code to retrieve encrypted communication information. For example, the MR headset may determine an encoding format associated with the machine-readable code, e.g., by identifying a portion of the image data that indicates the encoding format (e.g., by identifying a mode indicator that indicates a data type of data in the machine-readable code). Continuing with this example, the MR headset may then decode the machine-readable code based on the encoding format. The encoding format may indicate whether information encoded in the machine-readable code includes alphanumeric characters, numeric characters, Kanji, or the like. In some embodiments, the MR headset may retrieve the encrypted communication information by generating a series of characters that corresponds to the encrypted communication information based on the encoding format. For example, the series of characters may be a series of alphanumeric characters in an instance in which the encoding format indicates that the data type comprises alphanumeric characters.

At 310, the MR headset decrypts the encrypted communication information to obtain decrypted communication information. The decrypted communication information can include access point information. For example, the access point information can include wireless (e.g., WiFi, BLUETOOTH, etc.) network information, such as a Service Set Identifier (SSID), a wireless network password, etc.

In some embodiments, the MR headset can decrypt the encrypted communication information using a decryption key stored in memory of the MR headset. In some embodiments, such a decryption key can be stored in the memory of the MR headset during configuration of the MR headset. For example, a set of decryption keys can be downloaded or activated when an operator log into a verified account via the MR headset.

In some embodiments, an algorithm used to encrypt and decrypt the communication information may be a symmetric algorithm, such as the Data Encryption Standard (DES) algorithm, Triple Data Encryption Standard (3DES), or Advanced Encryption Standard (AES). In some embodiments, an algorithm used to encrypt and decrypt the communication information may be an asymmetric algorithm, such as Public-Key Cryptography, Rivest-Shamir-Adleman (RSA) cryptography, or the like. In some embodiments, different communications or messages may use one or more of different encryption/decryption algorithms.

At 312, the MR headset connects to the access point using the decrypted communication information. For example, the MR headset can transmit the password in connection with the network identifier to be authenticated to the access point. After connecting to the access point, the MR headset will be able to communicate with the MR control system.

In some embodiments, at 314, the MR headset receives user authentication information corresponding to a user account, such as a username, password information, or the like. In some embodiments, 314 occurs before other steps in process 300. In some embodiments, the user account may be a user account associated with a wearer of the MR headset to interact with the MR control system. For example, in some embodiments, a user account may be associated with one or more access permission levels; the permission levels may govern whether or not the user is permitted to perform various actions to interact with the MR control system or the semiconductor manufacturing tool. In some embodiments, such actions may include transmitting various operational instructions to a physical semiconductor manufacturing tool. In some embodiments, such operational instructions may include causing a position of a component of the physical semiconductor manufacturing tool to change, causing an operation to begin, changing a value of a setpoint or other parameter, and the like. In some embodiments, permission levels associated with the user account may be used by the MR control system to block executions of operational instructions not permitted based on the permission levels of the user account.

In some embodiments, permissions may be stored based on a role of a user associated with the user account within an organization. Examples of such roles include "process engineer," "technician," etc. For example, all users with the role of "process engineer" specified for their user accounts may be provided with permission to interact with the MR control system so as to allow them to adjust various parameters relating to aspects of how a particular semiconductor manufacturing process is performed, but such users may not be provided with permission to interact with the MR control system so as to allow them to initiate maintenance procedures, e.g., cause the MR control system to open a maintenance access door, initiate a calibration routine, etc. Conversely, users with a "maintenance technician" role may be provided with permissions that allow them to perform maintenance-related tasks involving the semiconductor manufacturing tool, but do not allow them to modify parameters relating to how a particular semiconductor process is performed using the tool.

In some embodiments, the user authentication information can include a username and/or user user-identifying information (e.g., a password, a PIN, biometric information, etc.) that identifies or validates an identity of a user associated with the user account.

In some embodiments, an indication of a username may be received via the MR headset. For example, in some embodiments, the MR headset may be configured to render a list of stored usernames (e.g., as a drop-down menu). The operator wearing the MR headset may then select a username from the list of stored usernames. In some embodiments, the MR control system may send a list of stored usernames associated with a specific semiconductor manufacturing tool to the MR headset.

In some embodiments, user identifying information may be received via explicit user input via the MR headset. For example, a password or a PIN may be received via a user interface rendered by the MR headset. Alternatively, in some embodiments, user identifying information may be automatically captured by the MR headset. For example, in some embodiments, biometric data, such as retinal image data, may be automatically captured by a camera of the MR headset.

It should be noted that, in some embodiments, both a username and user identifying information may be used to authenticate a user to the user account. Alternatively, in some embodiments, such as in an instance in which biometric data is used as user-identifying information, user-identifying information may be used to both identify a username and authenticate the user. For example, a retinal image, which may act in a manner similar to a fingerprint, may uniquely identify a user such that the retinal image may serve as both an indication of the username and user-identifying information that may be used to authenticate individual in question.

In some embodiments, at 316, the MR headset authenticates a user to the user account using the user authentication information. In some embodiments, 316 is performed after 314 but before one or more steps in process 300. For example, the MR headset can authenticate the user to the MR headset using the user authentication information and/or the user-identifying information. The user credentials may then be transmitted to the MR control system. As another example, in some embodiments, the MR headset can transmit the user authentication information to the MR control system, which may then authenticate the user upon verifying the received user authentication information with user authentication information stored by the MR control system.

Upon authentication of the user to the user account, the user may then be authorized to perform actions and/or view content via the MR headset that is indicated in permissions associated with the user account. In some embodiments, a user can control and view status of multiple different semiconductor manufacturing tools via his or her user account. In some embodiments, multiple different semiconductor manufacturing tools are of different types, such as different etch and deposition tools.

In some embodiments, blocks 314 and 316 may be omitted. For example, in some embodiments, a communication channel between the MR headset and the MR control system may be established without authenticating a user of the MR headset to a particular user account.

Figure 3B:
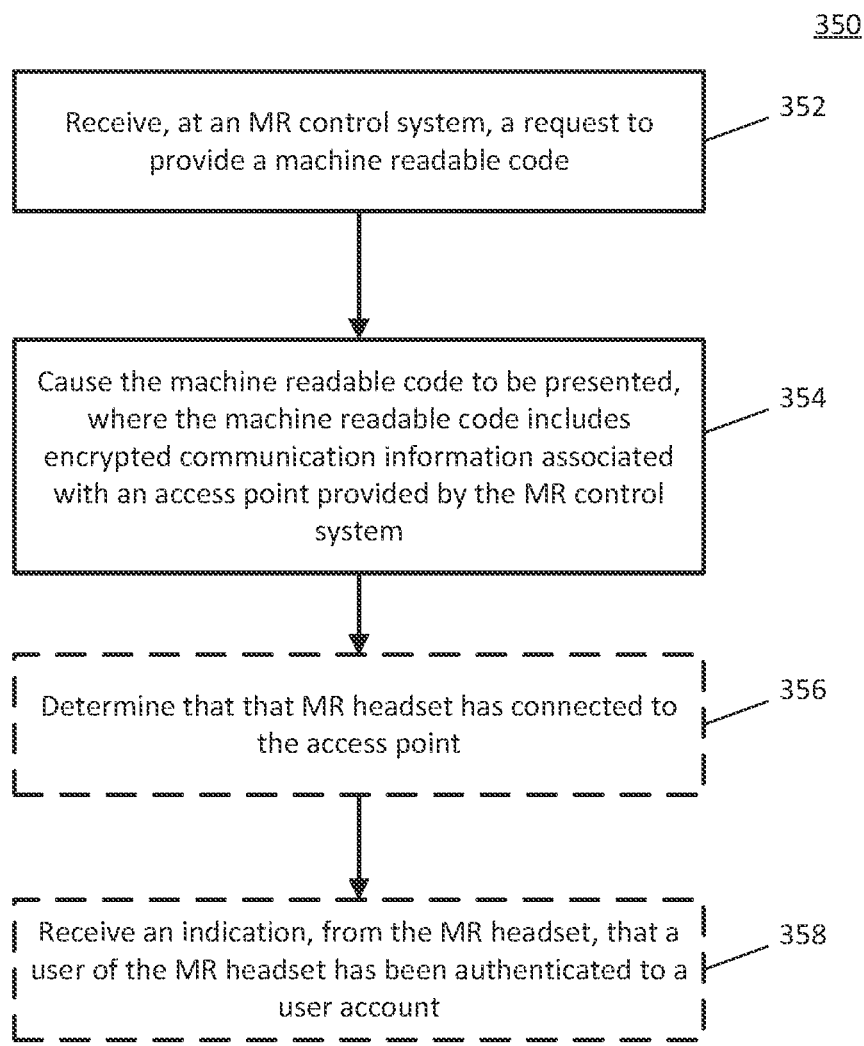

FIG. 3B shows an example of a process 350 for establishing a communication channel between an MR headset and an MR control system. Blocks of process 350 may be executed by an MR control system. It should be noted that, in some embodiments, the blocks of process 350 shown in FIG. 3B can be performed in various orders and, in the case of some blocks, performed concurrently. Additionally, in some embodiments, one or more blocks of process 350 may be omitted.

At 352, the MR control system receives a request to provide a machine-readable code. The request may be received from an MR headset. For example, in some embodiments, the MR headset may transmit the request for the machine-readable code in response to a selectable button or input being selected on the MR headset, as described above in connection with block 302 of FIG. 3A.

At 354, the MR control system causes the machine-readable code to be presented, for example, on a display screen associated with the MR control system. As described above in connection with FIG. 3A, the machine-readable code may include information associated with an access point used by the MR control system to provide access to a wireless network provided by the MR control system. For example, the information may include encrypted communication information, such as an identifier of the access point, a password associated with the access point, or the like.

In some embodiments, at 356, the MR control system determines that the MR headset has connected to the access point. For example, in some embodiments, the MR control system can determine that the MR headset has been authenticated to the access point using the password included in the information encoded in the machine-readable code. In some embodiments, block 356 may be omitted.

In some embodiments, at 358, the MR control system receives an indication, from the MR headset, that a user of the MR headset has been authenticated to a user account. In some embodiments, the user account may be associated with various permissions or access restrictions, as described above in connection with blocks 314 and 316 of FIG. 3A. In some embodiments, the MR control system may receive an indication of the particular user account. In some embodiments, the MR control system may determine permissions or access restrictions associated with the user account.

Use of a Mixed Reality (MR) Headset with an MR Control System

After a communications channel between an MR headset and an MR control system for a particular semiconductor manufacturing tool has been established, the MR headset may be used to interact with the semiconductor processing tool MR control system, e.g., to render or display user interfaces and/or operational data for the semiconductor processing tool.

Figure 4:
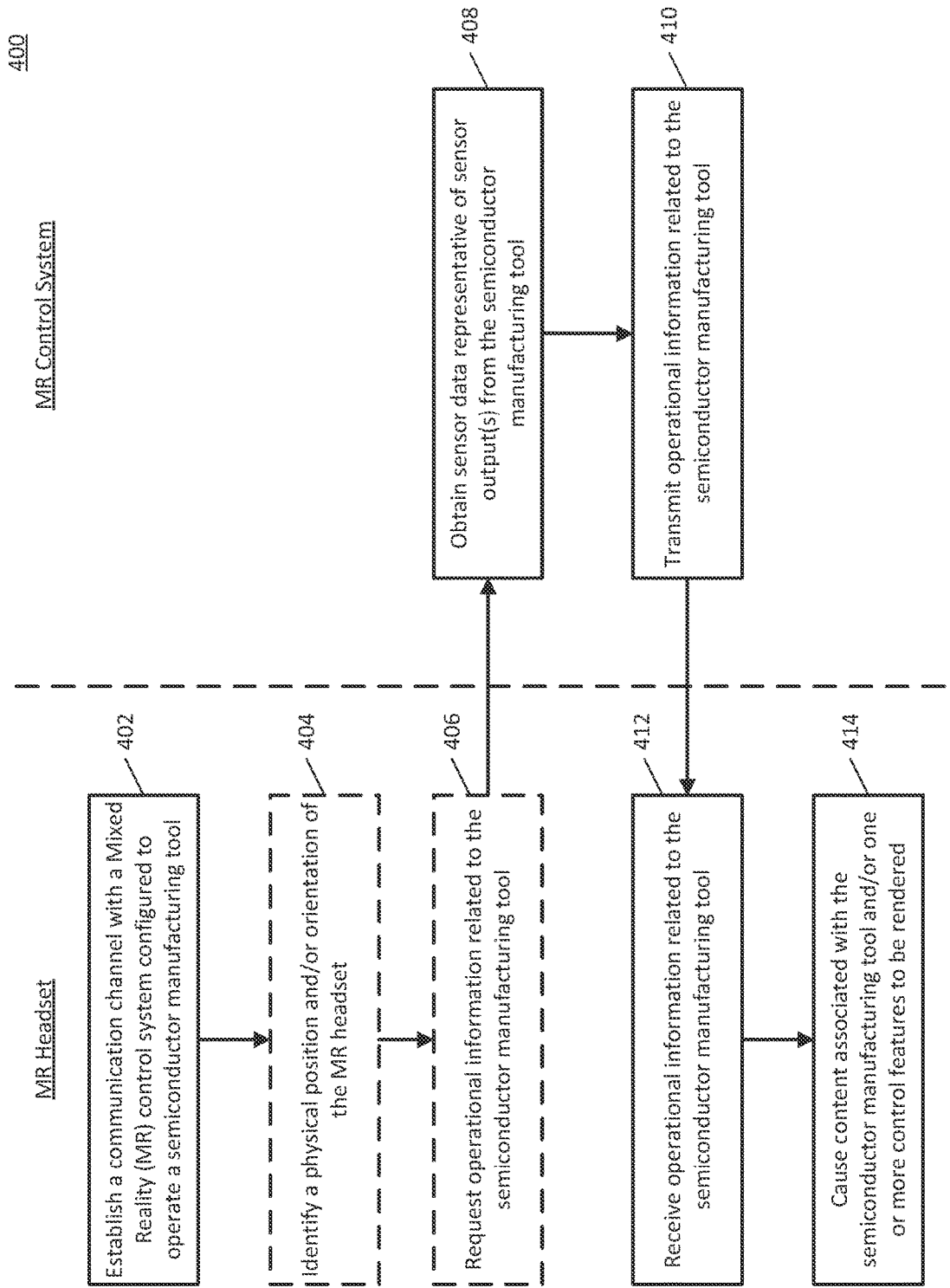
FIG. 4 shows an information flow diagram for controlling a semiconductor manufacturing tool in accordance with some embodiments.

FIG. 4 shows an example of an information flow diagram 400 for controlling a semiconductor tool in an MR environment in accordance with some embodiments. As illustrated, blocks of information flow diagram 400 are performed by an MR headset and an MR control system. It should be noted that, in some embodiments, the blocks of information flow diagram 400 shown in FIG. 4 can be performed in various orders and, in the case of some blocks, performed concurrently. Additionally, in some embodiments, one or more blocks of information flow diagram 400 may be omitted.

At 402, the MR headset establishes a communication channel with an MR control system configured to operate a semiconductor manufacturing tool. As described above in connection with FIG. 2, the MR control system may be in communication with a physical semiconductor manufacturing tool. Additionally or alternatively, the MR control system may be in communication with a digital twin of a physical semiconductor manufacturing tool, as described below in connection with FIG. 10.

The communication channel can allow the MR headset to transmit and receive messages from the MR control system. Example protocols that may be used in connection with the communication channel include MQ Telemetry Transport (MQTT), Hypertext Transfer Protocol (HTTP), and the like. Note that more detailed techniques for establishing such a communication channel are shown in and described above in connection with FIGS. 3A and 3B.

In some embodiments, at 404, the MR headset determines a physical position and/or an orientation of the MR headset. Note that, in some embodiments, block 404 may be omitted.

The physical position and/or the orientation of the MR headset can be based on information obtained by the headset from one or more cameras of the MR headset and/or one or more sensors (e.g., an accelerometer, a gyroscope, proximity sensor, etc.) of the MR headset.

In some embodiments, a physical position and/or an orientation can include a position and/or an orientation relative to a frame of reference that is fixed with respect to the physical environment. In some embodiments, the frame of reference may be determined based on various fiducials or fiducial marks that may be detected in the physical environment, e.g., by one or more cameras or sensors of the MR headset. Such fiducials or fiducial marks may correspond to various physical landmarks in the physical environment. Examples of physical landmarks include a portion or feature of a physical semiconductor manufacturing tool, a machine-readable code attached to a portion of a physical semiconductor manufacturing tool, and the like. In some such embodiments, the position and/or the orientation relative to a physical landmark may be determined based on image data captured using a camera of the MR headset that includes at least a portion of the physical landmark.

In some embodiments, at 406, the MR headset requests operational information related to the semiconductor manufacturing tool from the MR control system. In some embodiments, the MR headset may request the operational information based on a user input received via the MR headset. In some embodiments, the MR headset may share its physical/orientation position determined in 404 with the MR control system. For example, as shown in and described below in connection with FIGS. 5A and 6A-6E, the user input may correspond to selection of one or more user interface elements rendered by the MR headset. As another example, as shown in and described below in connection with FIGS. 5A and 7, the user input may correspond to capturing (e.g., via a camera of the MR headset) image data associated with a machine-readable code that has been pre-associated with a particular set of operational information.

It should be noted that, in some embodiments, block 406 may be omitted. For example, in an instance in which the MR control system transmits particular operational information automatically (e.g., not responsive to a request from the MR headset), block 406 may be omitted.

At 408, the MR control system obtains sensor data representative of sensor outputs from the semiconductor manufacturing tool. The sensor data may include sensor data from temperature sensors, pressure sensors, position sensors (e.g., encoders, or the like), motion sensors (e.g., accelerometers, or the like), or any other type of sensor associated with the semiconductor manufacturing tool. The sensor data may include multiple sensor values obtained over a series of timepoints. The sensor data may include sensor outputs from multiple sensors, which may be of different types and/or associated with different components or elements of the semiconductor manufacturing tool.

At 410, the MR control system transmits operational information obtained at 408 to the MR headset.

In some embodiments, the operational information may be based at least in part on the sensor data representative of sensor outputs from the semiconductor manufacturing tool. For example, in some embodiments, the operational information may be the sensor data obtained at block 408 or a portion of the sensor data obtained at block 408. As another example, in some embodiments, the operational information may include a state of one or more components of the semiconductor manufacturing tool that is determined based on the sensor data. For example, the operational information may include an indication of a state of a particular component (e.g., whether a valve is open or closed, a current position of a robot arm, a current speed with which a robot arm is moving, current gas flow rates, current pressure inside a module, temperature information, etc.), and the like. As yet another example, in some embodiments, the operational information may include states of one or more wafers undergoing fabrication, such as whether a wafer is in a particular process chamber, whether a wafer is clamped to or unclamped from an electrostatic chuck, etc.

In some embodiments, the operational information may include an indication of a current status of the semiconductor manufacturing tool or of one or more components of the semiconductor manufacturing tool. For example, the operational information may indicate a current process or recipe step that is being performed. As another example, the operational information may indicate an error status of a particular component. In some embodiments, error status may be determined based on the sensor data obtained at block 408. For example, an error status may be determined based on a determination that a value received by a particular sensor is outside of a normal operating range. In some embodiments, an error status may be determined based on the operating status of the sensors. For example, when one or more sensors are sending information at an irregular frequency or information that indicates a contradicting or very unlikely operating state of the tool (e.g., indicating that the pressure is very high but also indicating that the airlock is open), an alert may be generated.

At 412, the MR headset receives the operational information related to the semiconductor manufacturing tool from the MR control system. The operational information may be received via the communication channel established between the MR headset and the MR control system as described at block 402.

At 414, the MR headset causes content associated with the semiconductor manufacturing tool and/or one or more control features to be rendered. The content may be based on the operational information received at block 412. For example, as shown in and described below in connection with FIGS. 5A and 6C-6E, the content can include one or more user interface elements such as a display window with certain control tabs specific to a component in a physical semiconductor manufacturing tool. The content can further include operational information (e.g., sensor values, current operational states, or the like) associated with one or more components within the physical semiconductor manufacturing tool. As another example, as shown in and described below in connection with FIGS. 8A, 9A, and 9B, the content can include renderings of one or more internal elements of a physical semiconductor manufacturing tool that are presented as overlays over a visible portion of the physical semiconductor manufacturing tool. As yet another example, as shown in and described below in connection with FIG. 11A, the content can include three-dimensional renderings of components or elements of a digital twin rendered by an MR headset in an MR environment.

In some embodiments, the content can include one or more control features. The control features can be selectable user interface elements that, when selected, cause an operational instruction to be transmitted from the MR headset to the MR control system. The MR control system may then cause a command to be transmitted to the semiconductor manufacturing tool that causes the semiconductor manufacturing tool to change a state based on the operational instruction. Examples of operational instructions may include initiating a particular process or a simulation of a particular process, setting or modifying particular parameters or setpoints, and the like.

It should be noted that transmission of operational instructions may depend on permissions associated with a user account associated with the MR headset and the tool control product. In some embodiments, such permissions can be stored in association with the user account. For example, in some embodiments, an operational instruction (e.g., that causes a semiconductor manufacturing tool, operated by the MR control system, to perform an operation) may be inhibited or blocked in response to determining that a user associated with the user account is not authorized to perform the corresponding operation. In some embodiments, the MR control system may prohibit executions of an operational instruction not permitted based on permissions associated with a user account. Additionally or alternatively, in some embodiments, the MR headset may prohibit transmission of an operational instruction to the MR control system that is not permitted based on the permissions.

Rendering User Interface Elements that Indicate Semiconductor Manufacturing Tool Operational Information in an MR Environment After establishment of a communication channel between an MR headset and an MR control system, the MR headset and the MR control system can be used to render representations of user interface elements that indicate semiconductor manufacturing tool operational information in an MR environment and/or the correspond to control features associated with the semiconductor manufacturing tool. The user interface elements may be rendered in an MR environment, or in some instances, in an AR environment, such that the physical semiconductor manufacturing tool may be visible behind/or around the virtual user interface elements. Such interface presentation would allow a wearer of the MR headset access to current operational information and/or control features associated with the semiconductor manufacturing tool while moving around the physical environment that the tool is located in, while looking at various components of the semiconductor manufacturing tool, etc.

The MR headset can receive operational information from the MR control system that indicates, for example, sensor values, state information of various components, and the like. The sensor values, state information, etc. may be received by the MR control system from the semiconductor manufacturing tool. The MR headset can then cause user interface elements that indicate the received operational information to be rendered within the MR environment. For example, the user interface elements may be rendered such that the physical environment is visible behind and around the user interface elements. Additionally, the MR headset may render the user interface elements such that the user interface elements can be resized and/or repositioned by a wearer of the MR headset. For example, user interface elements may be "virtually" grabbed, pinched, etc. by the user in order to reposition or resize them.

Moreover, a user interface element such as a display panel may be configured to be fixed in place with respect to a particular frame of reference. For example, a user interface element may be configured by a wearer of an MR headset to be positioned at a particular position with respect to another user interface. That is, if the first interface element moves, the second interface element will move as well and maintain its position with respect to the first interface element. As another example, a particular user interface element may include one or more positioning elements that can be selected by a wearer of the MR headset that indicate the frame of reference to which the particular user interface element is to be fixed.

As another example, a user interface element may be configured to be positioned at a particular fixed position with respect to the projection of a physical/actual environment. As an example, in an instance in which a user interface element (e.g., an information display panel) is positioned at a particular fixed position with respect to the physical environment, the MR headset can determine whether a group of spatial coordinates that define a boundary of the user interface element are within the field of view (FOV) of the MR headset. Continuing with this example, in response to determining that the group of spatial coordinates that define the boundary of the user interface element are not within the current FOV of the MR headset, the user interface element will not be seen from the current FOV. As a specific example, in an instance in which a user interface (UI) element is to be fixed at a position of 30 degrees to the left of a fiducial mark in the physical environment (e.g., an edge or corner of a physical manufacturing tool, an edge or a corner of a particular machine-readable code affixed to an external portion of the physical manufacturing tool, etc.), the MR headset may identify the spatial coordinates that define a boundary of the user interface element with respect to the physical environment. Continuing with this specific example, in an instance in which the MR headset rotates 180 degrees so as to no longer be viewing 30 degrees to the left of the fiducial mark in the physical environment (and therefore, no longer be facing the position the user interface element has been configured to be fixed at), the MR headset can determine that the spatial coordinates defining the boundary of the user interface element are no longer within the current field of view of the MR headset (after it has rotated 180 degrees), and therefore not display the user interface element in the current field of view. In this specific example, if the MR headset is only partially rotated away from the fiducial mark (e.g., 90 degrees to the left), the UI element would still be present in the new field of view but its position relative to the new field of view would have changed (e.g., moved from the left side of the screen to the right side of the screen).

As yet another example, a user interface (UT) element may be configured to be positioned at a particular fixed position with respect to the field of view of the MR headset. As an example, such a UI element may then "follow" the wearer of the MR headset as the wearer moves around the physical environment or changes orientation within the MR environment. As a specific example, in an instance in which the UI element is configured to be positioned at 30 degrees to the left of a center of a field of view, the UI element can remain at that position regardless of the position and/or orientation of the MR headset with respect to the physical environment.

Figure 5A:
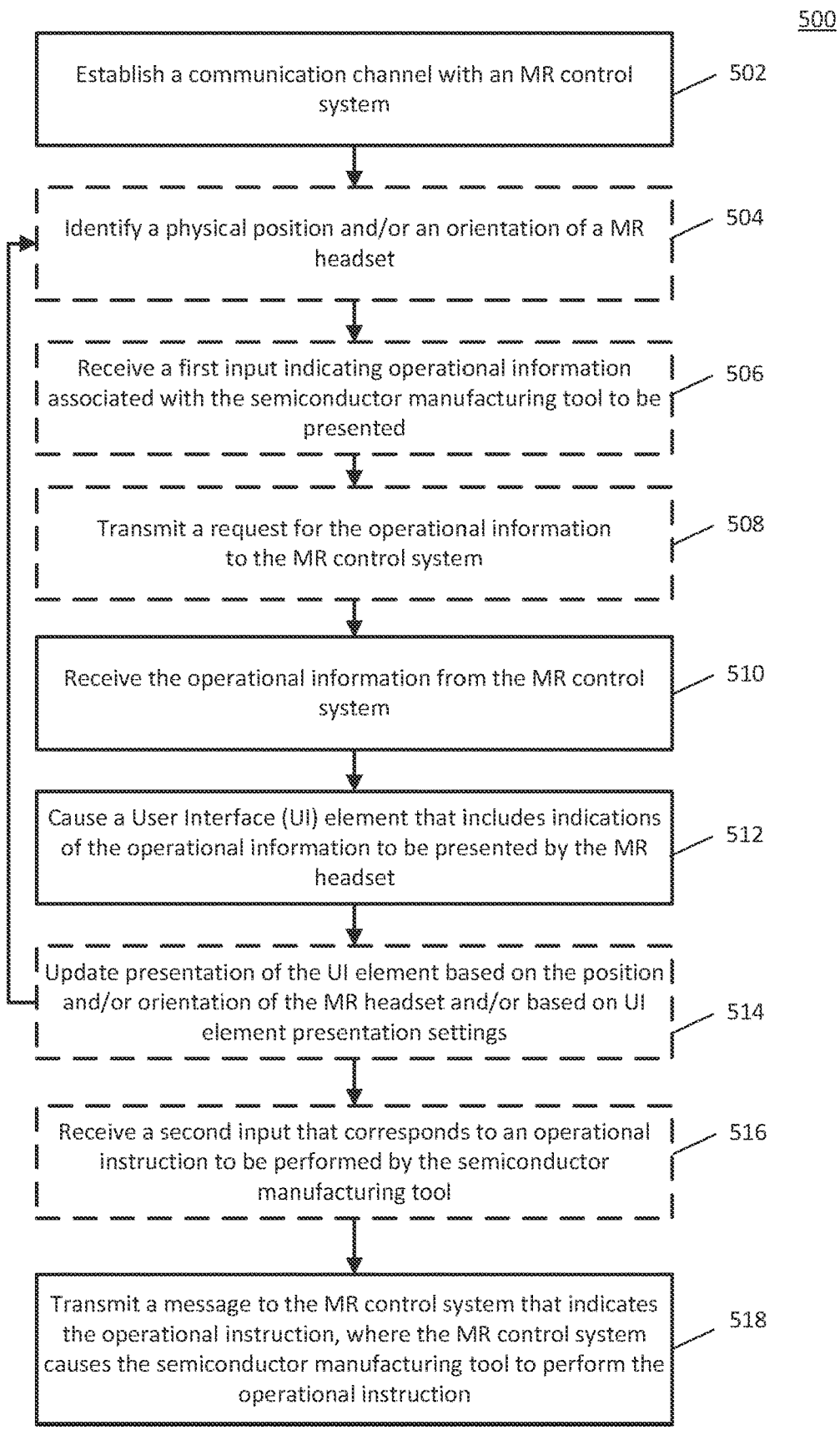
FIGS. 5A and 5B show flowcharts that illustrates example processes for rendering user interface elements that indicate operational information of a semiconductor manufacturing tool via an MR headset in accordance with some embodiments.
Figure 5B:
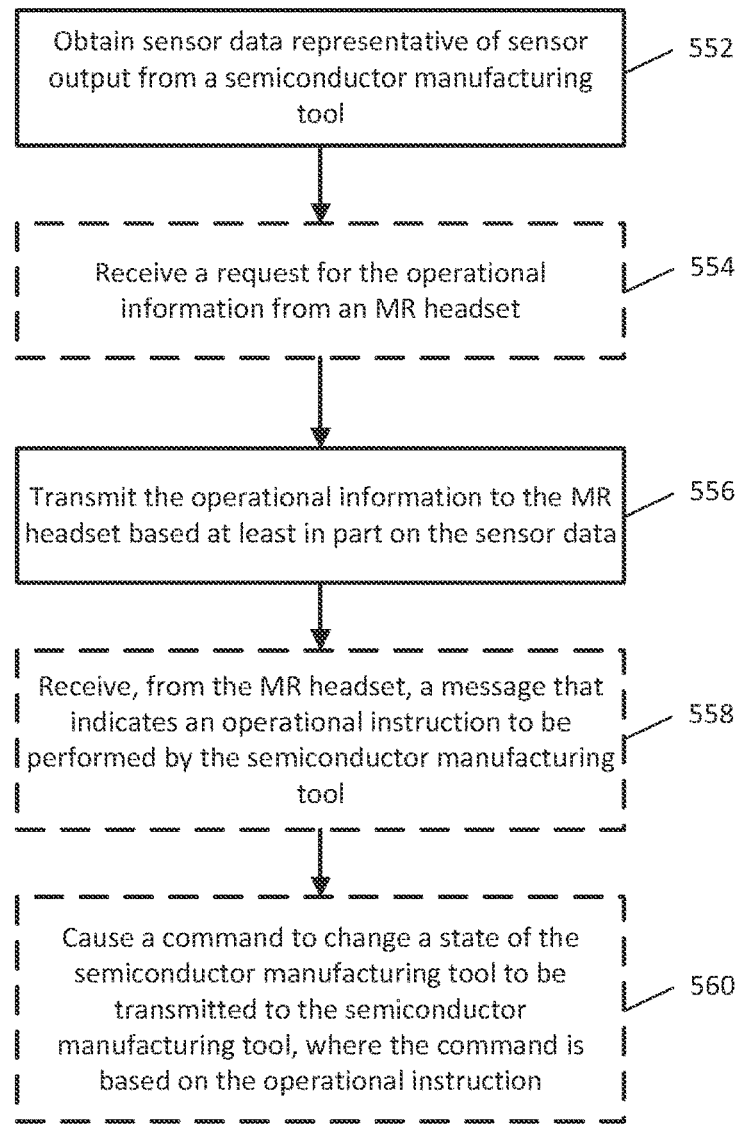
Figure 6A:
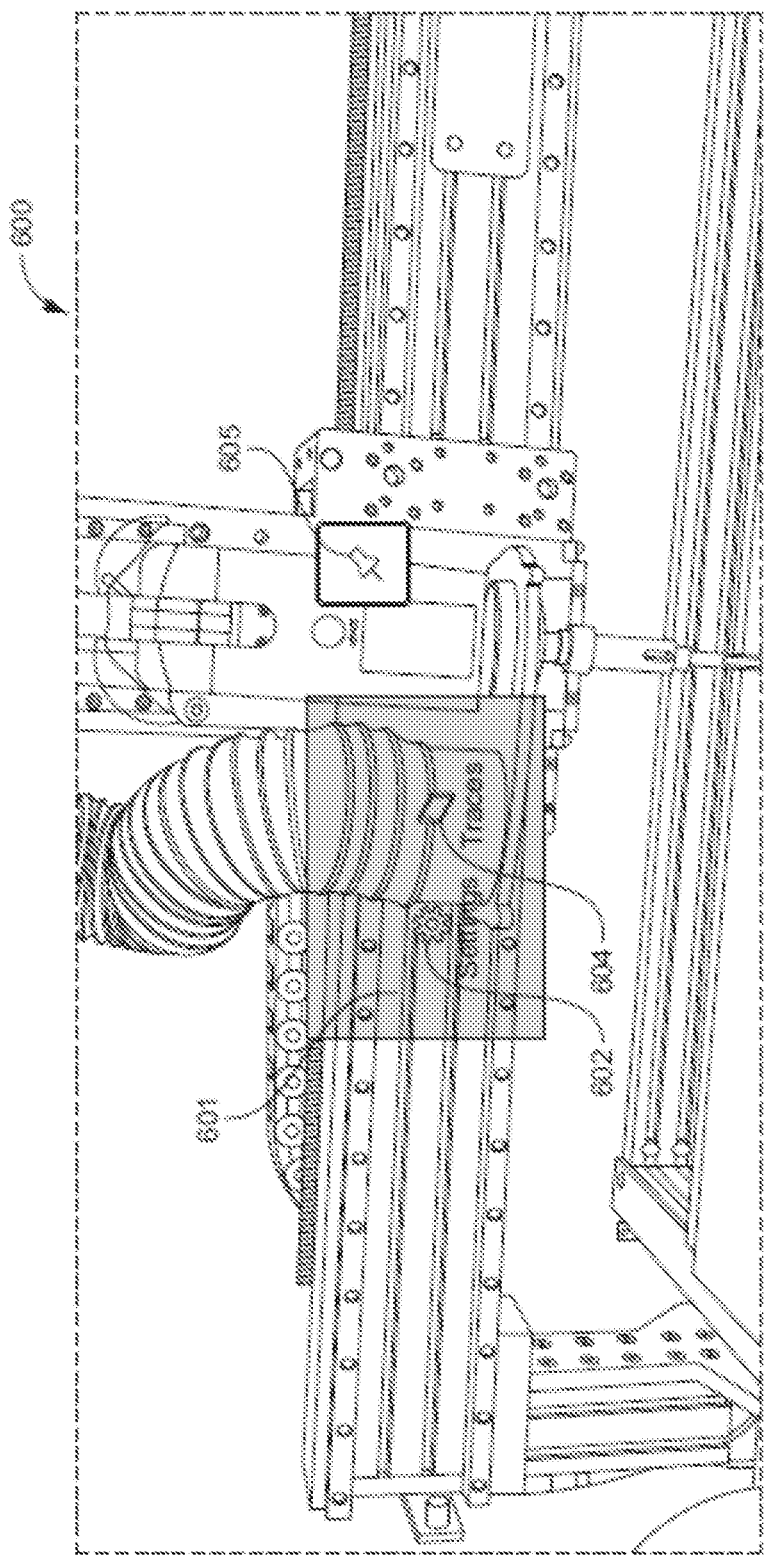
FIGS. 6A-6E show example views from a perspective of an MR headset associated with one or more steps of the processes shown in FIGS. 5A and 5B in accordance with some embodiments.
Figure 6B:
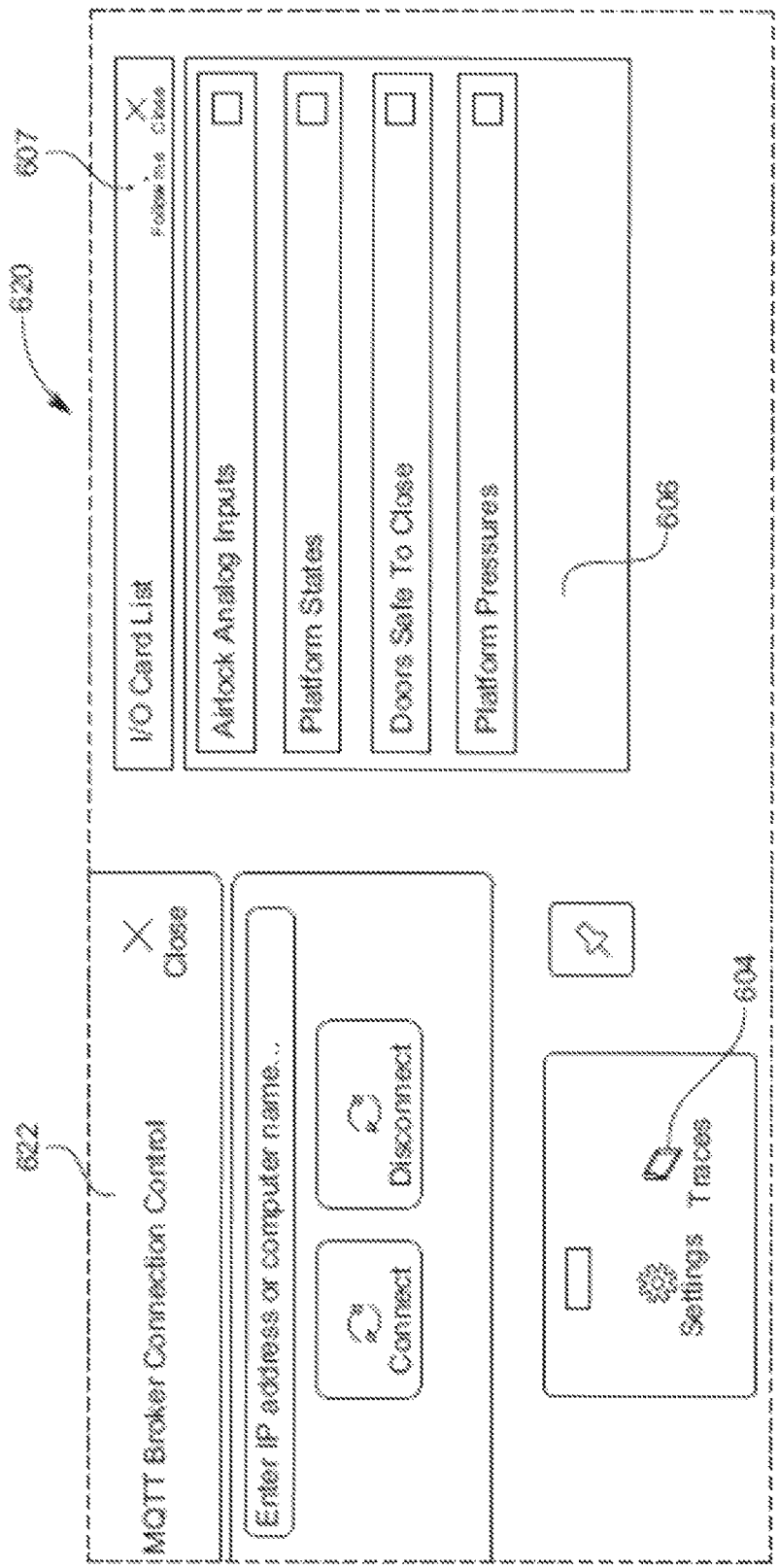
Figure 6C:
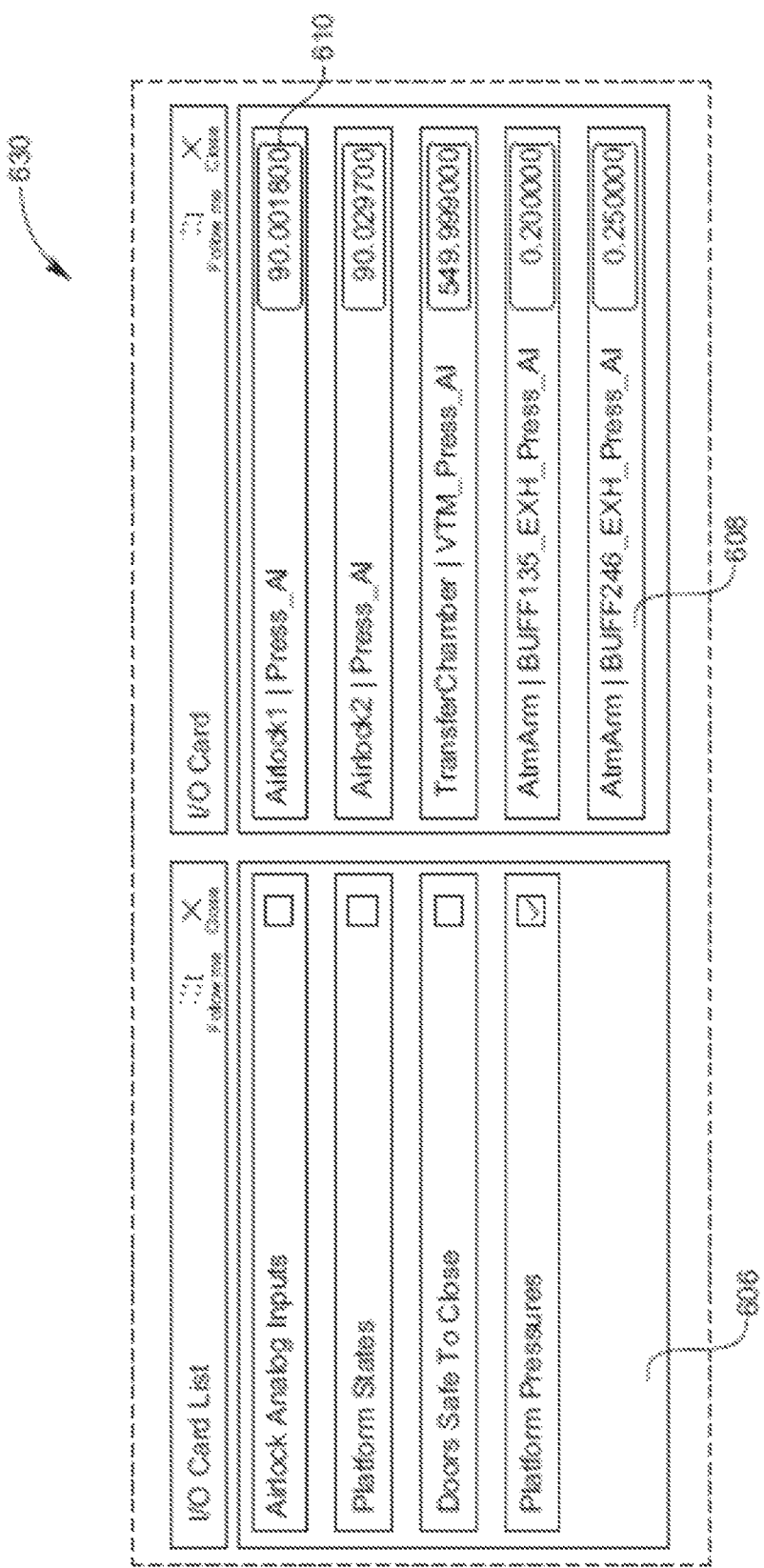
Figure 6D:
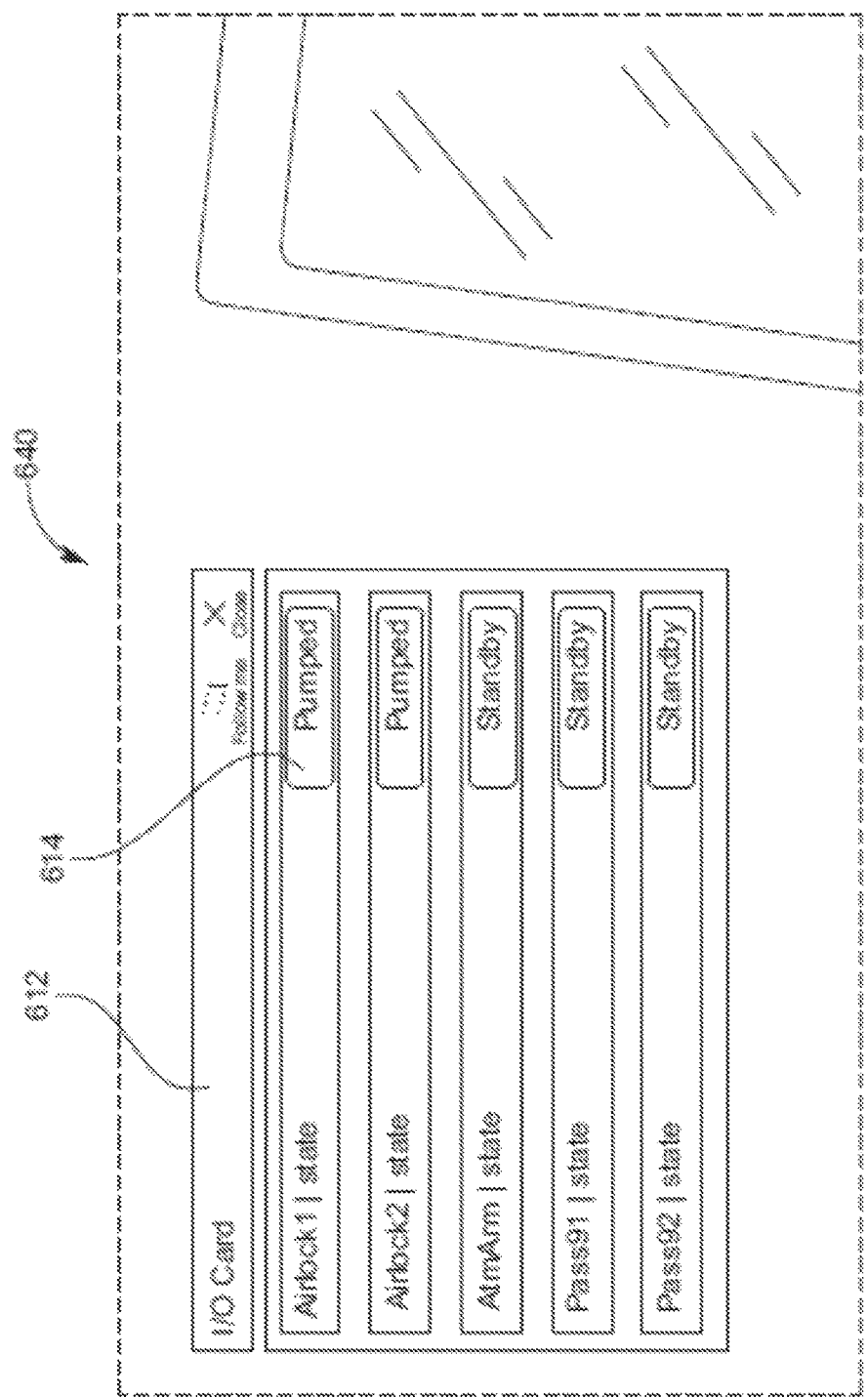
Figure 6E:
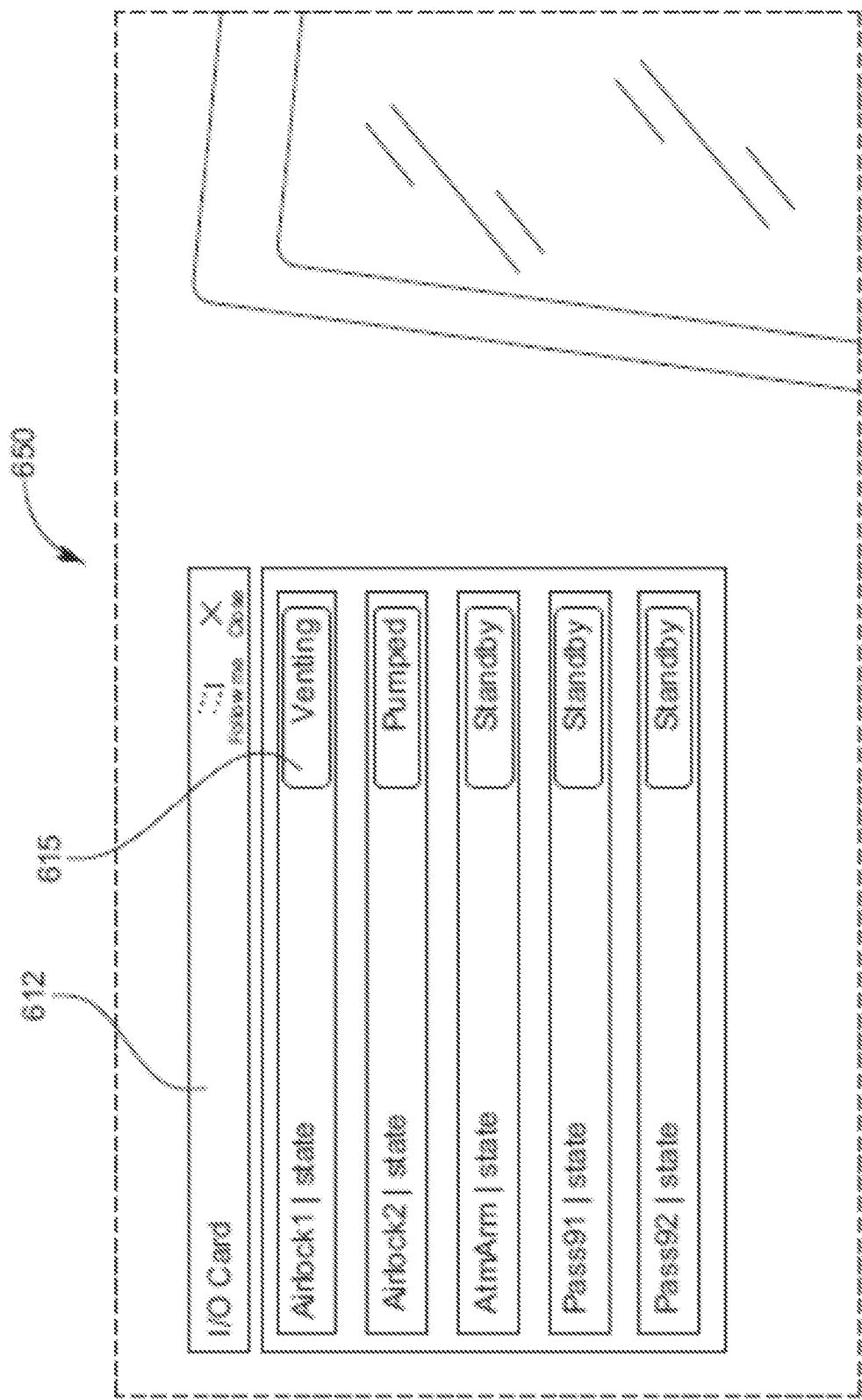
Figure 7:
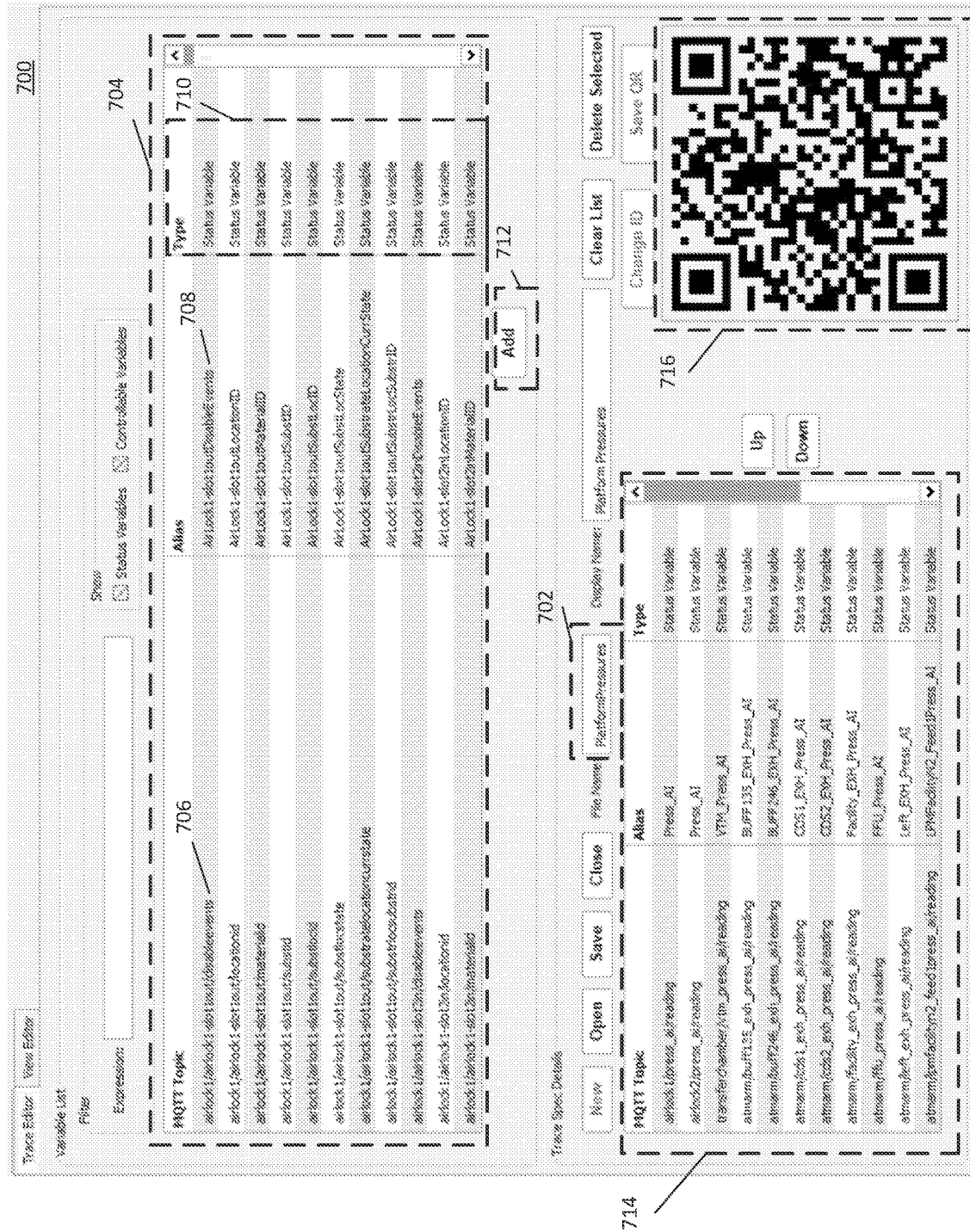
FIG. 7 shows an example of a configuration interface for configuring information to be rendered by an MR headset in accordance with some embodiments.

FIGS. 5A, 5B, 6A-6E, and 7 relate to rendering UI elements that indicate operational information and/or control features in an MR environment. FIG. 5A shows an example of a process 500 that can be implemented by an MR headset. FIG. 5B shows an example of a process 550 that can be implemented by an MR control system. FIGS. 6A-6E show example views from a perspective of a wearer of an MR headset associated with one or more steps shown in FIGS. 5A and 5B. FIG. 7 shows an example configuration interface for configuring information to be rendered by the MR headset.

Turning to FIG. 5A, an example process 500 for rendering user interface elements that indicate operational information of a semiconductor manufacturing tool and for receiving operational instructions to be performed by the semiconductor manufacturing tool is shown in accordance with some embodiments. Blocks of process 500 may be performed by an MR headset. In the following, one or more steps of process 500 will be described with exemplary fields of view shown in FIGS. 6A-6E. It should be noted that blocks of process 500 may be performed in an order not shown in FIG. 5A. Additionally or alternatively, in some embodiments, one or more blocks of process 500 may be omitted.

At 502, the MR headset establishes a communication channel with an MR control system configured to operate a semiconductor manufacturing tool. In some embodiments, 502 is performed using the descriptions associated with FIG. 3A.

After the MR headset establishes the communication channel with the MR control system, a user interface is rendered in an AR environment according to some embodiments of the present disclosure. FIG. 6A shows an example view 600 from the perspective of an operator wearing the MR headset after the establishment of the communication channel.

As illustrated, view 600 can include one or more UI elements rendered in an AR environment, such as a menu panel 602 and an operational information selection input 604 according to certain embodiments of the present disclosure. In some embodiments, selection of elements within menu panel 602 can allow a user to adjust one or more settings, such as appearances of UI elements presented by the MR headset, a volume level of sounds presented using the MR headset, etc. In some embodiments, selection of operational information selection input 604 can cause content reflecting various sets of operational information to be presented via the MR headset. Note that the virtual UI elements are presented as overlaid over a projection of a physical environment such that the physical environment is visible in view 600. While view 600 shows the UI elements are overlaid over the background projection of a physical environment, in some embodiments, the UI elements may be presented in the same plane as one or more background projections. That is, the UI elements would appear to be next to one or more projected background components. In some embodiments, one or more UI elements may be present and be associated with different components projected in the field of view. For example, one or more subcomponents in the background of view 600 may have a menu panel presented next to them, either via a master toggle or automatically, to enable component specific view and/or control. In some embodiments, the UI elements are opaque such that they completely block the details of the background component they overlaid. In some embodiments, one or more UI elements may have different degrees of transparency ranges from cloudy to nearly fully transparent. Employing UI elements with varying degrees of transparency would allow the user interface to be more immersive and thus enhance the operating efficiencies with semiconductor tools. An operator would no longer need to look up where a subcomponent is within an internal component (or what components are surrounding a component of interest) because such information and control panels will be graphically presented in a single view.

In some embodiments, selection of UI element 605 can cause a control panel 601 (e.g., that includes UI elements 602 and 604) to be fixed with respect to a position of the semiconductor manufacturing tool in the physical environment.

Referring back to process 500 in FIG. 5, in some embodiments, at 504, the MR headset identifies a physical position and/or an orientation of the MR headset. In some embodiments, the physical position and/or the orientation can be with respect to the physical semiconductor manufacturing tool or a portion of the physical semiconductor manufacturing tool. For example, the physical position and/or the orientation of the MR headset can be determined with respect to a machine-readable code affixed to a portion of the physical semiconductor manufacturing tool, with respect to a physical landmark, or a fiducial marker (e.g., a particular screw, a particular edge of a wall, etc.) of the physical semiconductor manufacturing tool, etc.

The physical position and/or the orientation of the MR headset may be determined using one or more cameras and/or one or more sensors (e.g., an accelerometer, a gyroscope, etc.) of the MR headset. In some embodiments, the physical position and/or the orientation of the MR headset may be determined by updating a previously determined physical position and/or orientation based on a movement direction and speed indicated by one or more cameras and/or one or more sensors.

Note that, in some embodiments, block 504 may be omitted. For example, in an instance in which user interface elements are presented irrespective to the field of view of the MR headset, the MR headset may not use physical position and/or orientation information. Accordingly, in some embodiments, block 504 may be omitted.

In some embodiments, at 506, the MR headset receives a first input requesting certain operational information associated with the semiconductor manufacturing tool to be displayed. It should be noted that, in some embodiments, operational information may be grouped into various/multiple sets of operational information. A set of operational information may include data (e.g., sensor data) associated with similar components or elements. For example, a set of operational information may include sensor outputs from pressure sensors associated with various airlocks of the semiconductor manufacturing tool. In another example, a set of operational information may include multiple sensor outputs from a single processing chamber of the semiconductor manufacturing tool. In another example, a set of operational information may include multiple sensor outputs from a similar sensor or sensors for multiple processing chambers of the semiconductor manufacturing tool, e.g., identical pedestal temperature sensors that are present in each processing chamber of the semiconductor manufacturing tool.

In some embodiments, the one or more inputs can include capture of image data (via a camera of the MR headset) that includes a machine-readable code that has been associated with a set of operational parameters such as a QR code affixed to a process chamber or displayed on a semiconductor manufacturing tool's display screen. In some such embodiments, the machine-readable code may be affixed to an external portion of the semiconductor manufacturing tool and/or may be presented via a display of a device executing the MR control system. In instances in which the input includes capture of image data that includes a machine-readable code, the MR headset can decode the machine-readable code to obtain an identifier embedded within the machine-readable code. In some embodiments, the identifier is uniquely associated with a particular set of operational parameters with respect to at least one or more components of the semiconductor manufacturing tool that the MR control system is communicating with.

Additionally or alternatively, in some embodiments, the input can include selection of one or more selectable inputs of a user interface element rendered by the MR headset (e.g., command tabs displayed in a virtual control panel).

For example, referring back to FIG. 6A, in response to selecting the operational information selection input 604, a virtual panel that shows available sets of operational information can be rendered via the MR headset.

FIG. 6B shows an example view 620 that includes a I/O Card List 606 (which can be referred to as menu 606) of available sets of operational information. It should be noted that the "I/O cards" (rectangular panels listed under I/O Card List 606) shown in FIG. 6B are each corresponding to a set of operational information. It should be understood that these I/O cards are presented as an example, they may be referred to using different names to associate different functions or features within a semiconductor manufacturing tool. As illustrated, I/O Card List 606 indicates available sets of controls corresponding to: "Airlock analog inputs;" "Platform states;" "Doors safe to close;" and "Platform pressures." It should be noted that the available sets of operational information shown in I/O Card List 606 are merely shown by way of example, and other sets of operational information may be presented in a menu in addition to or instead of those shown in FIG. 6B. Additionally, I/O Card List 606 may be updated based on one or more user selections. For example, I/O Card List 606 may correspond to a multi-level menu structure such that the controls presented in connection with I/O Card List 606 change as the multi-level menu structure is traversed. As a more particular example, I/O Card List 606 may initially present various controls corresponding to "parent-level" options. Continuing with this more particular example, in response to selection of a particular control from the parent-level of options, I/O Card List 606 may expand to show sublevel control or information correspond to "child-level" options nested under the selected parent-level option.

I/O Card List 606 additionally includes a "follow-me" input 607. In some embodiments, selection of "follow-me" input 607 would cause I/O Card List 606 to remain fixed in a particular viewing position within an operator's field of view irrespective to the changes to the MR headset's position and orientation. For example, in an instance in which I/O Card List 606 is initially presented at a position that is 30 degrees to the left of a center position of the field of view of the MR headset, and in which "follow-me" input 607 has been selected, I/O Card List 606 can continue being presented at 30 degrees to the left of the field of view center even as the position/orientation of the MR headset changes. In some embodiments, the viewing size and resolution of the UI element (e.g., I/O Card List 606) remains the same when the operator moves closer or further away from the target object in the background. In some embodiments, when a UI element is instructed not to follow, or be fixed in a space relatively to the projected background, the viewing size and resolution of the UI may change depending on the operator's distance to the target object in the background. For example, when the operator backs away from the target object, the viewing size of the UI element (e.g., I/O Card List 606) may shrink. Conversely, as the operator walks closer to the target object, the viewing size of the UI element may increase up to a predetermined size limit. It should be noted that any user interfaces element (e.g., display panels) rendered by the MR headset may include such a "follow-me" function.

As illustrated, example view 620 includes a connection panel 622. In some embodiments, connection to an MR control system can be facilitated by, for example, entering an Internet Protocol (IP) address or a computer name of a particular control system. In some embodiments, the MR headset can be connected to multiple MR control systems in one session via the connection panel 622. As described above in connection with FIG. 2, the connection may be MQTT, HTTP, Extensible Messaging and Presence Protocol (XMPP), Constrained Application Protocol (CoAP), or other protocol.

Referring back to process 500 in FIG. 5A, in some embodiments, at 508, the MR headset may request a set of operational information from the semiconductor manufacturing tool from the MR control system. In an instance in which the input received at block 506 is a selection of one or more selectable user interface elements, the MR headset can request the indicated set of operational information by transmitting identifier(s) of the selected user interface elements to the MR control system. For example, in an instance in which a selected user interface element corresponds to "Platform pressures" from a menu of available sets of operational information shown in FIG. 6B, the MR headset can transmit the command that the "Platform pressures" element was selected from the menu to the MR control system.

In an instance in which the input received at block 506 is image data that includes a machine-readable code such as a QR code scan, the MR headset can transmit a decoded identifier retrieved from the machine-readable code to the MR control system. In some embodiments, upon receiving the command from the MR headset, the MR control system can then identify a set of operational information associated with the identifier.

At 510, the MR headset receives the operational information from the MR control system.

It should be noted that, in some embodiments, blocks 506 and 508 can be omitted. For example, in some embodiments, the MR headset may receive a stream of operational information at block 510 that is transmitted by the MR control system to the MR headset without being requested by the MR headset. Such streamed operational information may include information related to an operational status of the semiconductor manufacturing tool deemed to be of an importance that content associated with the operational status is to be presentable by the MR headset regardless of whether the content is explicitly requested by a wearer of the MR headset. Such operational status information may include information that indicates an error state of one or more components, a hazard condition, connectivity or signal strength/error, information related to user permissions, location specific operating instructions (e.g., rules associating with specific plant), and the like.

After receiving the operational information at 510, at 512, the MR headset displays and presents the received operational information to the user. In some embodiments, the MR headset may present UI elements which can include one or more text boxes, virtual gauges, virtual meters, virtual indicators (such as virtual indicator lights, checkboxes, radio buttons, etc.) or other elements that reflects data or information received at 510. It should be noted that data or information presented in the user interface element may be substantially real-time data or information. For example, the data or information may correspond to current or recent sensor values of sensors associated with the semiconductor manufacturing tool, e.g., data that is presented to the user as soon as it is available to the MR headset (there may be some lag due to transmission lag between when the value or values were obtained and when the values are finally received by the MR headset).

In some embodiments, the received set of operational information may be formatted in any suitable manner by the MR headset. For example, a UI notification that indicates that a sensor value or a state of a component is an error state or an anomalous state may be presented in a visual manner that indicates such a status (e.g., presented in red, presented as blinking or flashing, etc. to draw attention to the error state). As another example, a UI notification that indicates that a sensor value or a state of a component is currently powered on or is in a usable state may be presented in a visual manner that indicates such a status (e.g., presented in green, presented in connection with a check mark, etc.).

An example view of how the operational information is displayed via the MR headset is shown in FIG. 6C. In FIG. 6C, view 630 shows a I/O Card 608 that displays the received operational information related to pressures associated with various components of the semiconductor manufacturing tool (e.g., pressures of one or more process chambers, pressures of one or more airlocks, and the like). The I/O Card 608 is a pop-up panel linked to the "Platform Pressures" control shown in the parent I/O Card List 606. In some embodiments, the I/O card 608 is displayed in response to a selection to one or more controls on the parent I/O Card List 606 (e.g., the check box in the "Platform Pressure" control). As shown, I/O Card 608 includes descriptions for various components in a semiconductor manufacturing tool and their associated pressure value meters 610, which indicate pressure detected for the various components. In some embodiments, the unit of measure can be changed which would then change the value being displayed in pressure value meters 610. In some embodiments, the UI panel (e.g., I/O Card 608) may have one or more nested subcomponents, such that clicking one displayed component would expand the list and open up descriptions and associated sensor values for the subcomponents. In some embodiments, the components displayed in a UI window (e.g., I/O Card 608 or I/O Card List 606) are preconfigured and fixed. In some embodiments, the components displayed in a UI window is dynamic. That is, in some embodiments, the MR headset or the MR control system may use certain conditions or rules to determine what components should be displayed closer to the top of the list (i.e. dynamically ranking the display order), to hide, or to be on the first or second page of the display if the list is very long. Such conditions or rules may include considerations for, but not limited to, the location of the MR headset, the MR headset's physical proximity to one or more areas of the tool, one or more component's or subcomponent's usage rate, failure probability, or criticality to certain processes. For example, when an operator is looking directly into a process chamber, the UI window may list the pressure information for the components physically closer to the operator ahead of components that are physically further away from the operator.

FIG. 6D shows an example view 640 that include V/O Card 612 displaying current status of multiple components in their respective status box 614. For example, FIG. 6D shows that Airlock 1 is "Pumped" and AtmArm (atmosphere arm) is on "Standby." Similar to the functions described with respect to FIG. 6C, the listing order of the components can be preconfigured or dynamic. Furthermore, the status box 614 may be updated frequently (e.g., real-time status confirmation update at a set interval) or updated based on an occurrence of an event.

Referring back to process 500 in FIG. 5A, at 514, the MR headset may optionally update UI elements based on the position or orientation of the MR headset or based certain UI element presentation setting.

In some embodiments, presentation of the UI element may be updated based on user inputs received via the MR headset. In some embodiments, a size of the UI element may be modified based on user inputs that resize the UI element. For example, the UI element may be enlarged in size in response to receiving certain user inputs (e.g., pinching or pulling the UT element). As another more particular example, a position or orientation of some of the UT element may be modified based on received user inputs. As a specific example, in some embodiments, the UI element may be moved by a user grabbing the UI element and positioning the UI element at a different location within the MR environment. In some embodiments, the user may also change the orientation of one or more UI elements in the MR environment with respect the user's field of view. For example, in some embodiments, the user may tilt a UI window by pushing one side of the UI window away from the user's viewing angle, so that, like a door with one side hinged, the UI window will swing open (or away) from the user's view angle. Although certain objects are rendered in two-dimensions (2D) such as the UI windows shown in FIG. 6C, embodiments of the present invention enable these objects to move in three dimensional (3D) spaces as shown in the example above. Such capability increases customization options for semiconductor manufacturing/fabrication tools' GUI, so that operators may build scenario-based UI in a short amount of time. In some embodiments, the UT windows and panels may be rendered in 3D.

As another example, a position or orientation of the UI element may be updated based on a change in a position or orientation of the MR headset. For example, in an instance in which the UT element has been set to be fixed in a position with respect to the physical environment, the user interface element can be rendered at different positions or angles with respect to the user's viewing angle based on the position or orientation of the MR headset.

In some embodiments, presentation of the operational information can be updated based on the updates received from the MR control system. For example, the sensor value meters shown in FIG. 6C can be updated to indicate more recently received sensor data.

In some embodiments, presentation of the user interface element may be updated based on a combination of user input(s), change in a position or orientation of the MR headset, and/or updated operational information.

Turning to FIG. 6E, an example view 650 shows a status box 614 of the I/O Card 612 previously shown in FIG. 6D is updated in response to a command issued to the semiconductor tool. As illustrated, the state of Airlock 1 is changed in a box 615, indicating that the state of Airlock 1 has changed from "Pumped" (as in FIG. 6D) to "Venting" (as in FIG. 6E). In some embodiments, the command is issued from the MR headset. In some embodiments, the command is issued from a system independent of the MR headset and MR control (e.g., from the onboard control of the semiconductor fabrication tool).

Referring back to process 500 in FIG. 5A, in some embodiments, block 514 can be omitted. For example, in an instance in which no user inputs to change a positioning, size, or orientation of the user interface element have been received, no updated operational information has been received, and a position or orientation of the MR headset has not changed, presentation of the user interface element may remain unchanged. Accordingly, in such an example, block 514 may be omitted.

In some embodiments, the MR headset loops back to block 504 and identifies an updated physical position and/or an orientation of the MR headset. The MR headset can then continue receiving operational information and presenting user interface elements that indicate the operational information.

Subsequent to step 512 or 514, the process 500 may optionally move to block 516 where the MR headset may receive a second input that corresponds to an operational instruction or command to the semiconductor manufacturing tool. Examples of operational instructions/commands include, but not limited to, starting or stop a particular process or step of a process, changing a state of a particular component (e.g., initiating venting of a particular airlock, closing a particular door, or the like), etc.

In some embodiments, the second input may be received by the MR headset as a selection of a control feature rendered by the MR headset. For example, the control feature may correspond to a push button to initiate execution of the operational instruction (e.g., a push button that states "begin venting," or the like). In some embodiments, the second input may be an operating instruction given via a voice command. In some embodiments, the control features may be rendered based on the process/component being accessed. For example, when a user is viewing a specific process chamber and clicks platform pressure, the MR headset may generate "pump" and "venting" controls along with the status and/or pressure value associated with the specific process chamber.

At 518, the MR headset transmits the received command or operating instruction to the MR control system. The MR control system may then cause the semiconductor manufacturing tool to perform the activity received from the operational instruction.

FIG. 5B illustrates an example process 550 executable by an MR control system of the present disclosure to control a semiconductor manufacturing/fabrication tool in an MR environment according to some embodiments. Steps of process 550 may be performed by an MR control system. It should be noted that steps of process 550 may be performed in an order not shown in FIG. 5B. Additionally or alternatively, in some embodiments, one or more steps of process 550 may be omitted.

At 552, the MR control system obtains sensor data representative of sensor output from a semiconductor manufacturing tool. The sensor data may be sensor outputs from any sensor in a semiconductor manufacturing tool such as a temperature sensor, a pressure sensor, optical sensor, a position sensor, a motion sensor (e.g., an accelerometer, a gyroscope, or the like), or a combination thereof. The sensor data may be obtained from multiple sensors, where the multiple sensors are different types of sensors and/or are associated with different components of the semiconductor manufacturing tool.

At 554, the MR control system may receive a request for operational information from the MR headset or other control platforms (e.g., onboard control system of the semiconductor manufacturing tool). As described above in connection with blocks 506 and 508 of FIG. 5A, the request may be received via selection of a user interface element rendered on the MR headset, via capture of a machine readable code by the MR headset, via an operator's voice command to the MR headset, or the like. In some embodiments, block 554 may be omitted. For example, in instances in which the MR control system continually or periodically transmits streams of operational information regardless of whether the operational information has been explicitly requested by the MR headset, block 554 may be omitted.

At 556, the MR control system transmits the operational information to the MR headset based at least in part on the sensor data obtained at step 552. In some embodiments, the MR control system may identify the operational information based on the request received at step 554. For example, the MR control system may identify a set of operational information associated with a machine-readable code captured by the MR headset.

At 558, the MR control system may receive a command or operating instruction to be performed by the semiconductor manufacturing tool from the MR headset or other control platforms. As described above in connection with block 516 of FIG. 5A, the operational instruction may correspond to starting or stopping a particular process or step of a process, changing a state of a particular component, or the like.

At 560, in some embodiments, the MR control system causes a tool command to change a state of the semiconductor manufacturing tool to be transmitted to the semiconductor manufacturing tool, where the command is based on the command or operating instruction received at step 558. In some embodiments, the MR control system transmits the tool commands via a wired connection. In some embodiments, the MR control system transmits the tool commands wirelessly.

In some embodiments, a set of operational information may be configured via a user interface. Such a user interface may be presented by an MR control system for configuring a set of operational information presented by an MR headset in communication with the MR control system. In some embodiments, a set of operational information may be configured by selecting one or more variables for inclusion in a set of operational information. Each variable may represent an operational state or a sensor output of a physical semiconductor manufacturing tool, where values of the variable may be transmitted to an MR headset in communication with the MR control system.

FIG. 7 shows an example configuration interface 700 that can be used to configure information and UI elements rendered in the MR headset in accordance with some embodiments. Referring back to FIG. 2, in some embodiments, the configuration interface 700 may be accessed through the MR control system 202, the MR headset 206, the Server 210, or the onboard control system of the semiconductor tool.

As illustrated, the configuration interface 700 can include a group identifier 702 that indicates a particular set of tool functions or features. In the example shown, group identifier 702 shows "Platform Pressures," which corresponds to "Platform Pressure" shown in the I/O Card List 606 in FIG. 6B.

The configuration interface 700 further includes a panel 704 that indicates available variables for inclusion in the set of tool functions or features. For example, panel 704 includes a variable 706 named "airlock1/airlock1-slot1out/disableevents." Additionally, panel 704 can include, for each variable, an alias of the variable. For example, an alias 708 of variable 706 is "AirLock1-slot1outDisableEvents."

In some embodiments, each variable included in panel 704 may be associated with a variable update parameter 710. In some embodiments, the variable update parameter can be set to either "status variable" or "controllable variable." "Status variable" generally refers to variables or values that are measured values or measured states that cannot be modified by a user. By contrast, "controllable variable" generally refers to variables or values that can be set by a user.

The configuration interface 700 includes an add button 712. In response to selecting add button 712, variables selected in panel 704 can be included in a selected variables panel 714. Selected variables panel 714 indicates variables that have been selected to be associated with the group identifier 702.

In some embodiments, a set of selected variables in the variable panel 714 may be associated with a machine-readable code such as a QR code shown in FIG. 7. In some embodiments, the machine-readable code can be selected or generated within the configuration interface 700. QR code 716 is an example of a machine-readable code that is programed to be associated with the set of variables in the variable panel 714. For example, each set of variables selected using the configuration interface 700 may be assigned a unique group identifier (e.g., 702), which can then be encoded in a machine-readable code. In operation, an MR headset can scan the machine-readable code generated by the configuration interface 700 to open a list of functions or features linked to the underlying variables and recognized by the MR control system. This way, the MR headset can request the data associated with the set of functions or features associated with that identifier from the MR control system.

In some embodiments, a machine-readable code may be associated with multiple different types of display functions and capabilities such as displaying the I/O Card or I/O Card List shown in FIGS. 6A-6E and opening relevant information associated with the function of interest (e.g., procedure manuals, a log of maintenance information, or the like). In some embodiments, the machine-readable code may store hyperlinks associated with each menu option that, when selected, cause the associated hyperlink to open. In some embodiments, the machine-readable code may be linked to multiple menu options that points to different records of instructions in the MR control system. For example, in an instance in which a machine-readable code is associated with "Platform Pressures," upon scanning the machine-readable code, the MR headset may open a GUI that presents options to display the variables associated with the identifier "Platform Pressure" (e.g., the I/O card with airlock 1 and airlock 2, such as I/O Card 608 of FIG. 6C), or open other related documents such as a procedures manual associated with one or more airlocks, maintenance information associated with one or more airlocks, or the like. The document may be in any suitable format, such as in a markup language (e.g., HTML, XML, or the like), a Portable Document Format (PDF) document, or the like.

Rendering States of Internal Components Using MR Headsets

In some embodiments, representations of states, or states over time, of internal components (e.g., robotic arms, lift pins, slit valves, wafer supports, indexers, carousels, showerheads, wafers undergoing fabrication, and the like) of a semiconductor manufacturing tool can be rendered using an MR headset in an MR environment. In effect, such representations may appear to allow a wearer of the MR headset to "look inside" a closed semiconductor manufacturing tool to view internal components of interest which may not be visible from an external wall of the semiconductor manufacturing tool without taking apart the tool.

For example, representations of the internal components may correspond to positions of the internal components and/or movement of the internal components. The representations may include 3D images, sequences of 3D images, or animations that depict the one or more internal components. The 3D images, or sequences of 3D images may be rendered in a size and/or orientation that is based at least in part on one or more of the position, orientation, and distance of the MR headset to the internal component of interest or to a certain fiducial mark on the semiconductor manufacturing tool. The position, orientation, and/or distance of the MR headset to the component of interest or the fiducial mark may be determined partly by one or more location sensors in the MR headset. In some embodiments, the estimated or near real-time actual positions of the components of interest (e.g., robotic arms for moving wafers) are rendered according to the position data received from one or more sensors in the semiconductor manufacturing/fabrication tool.

Figure 8A:
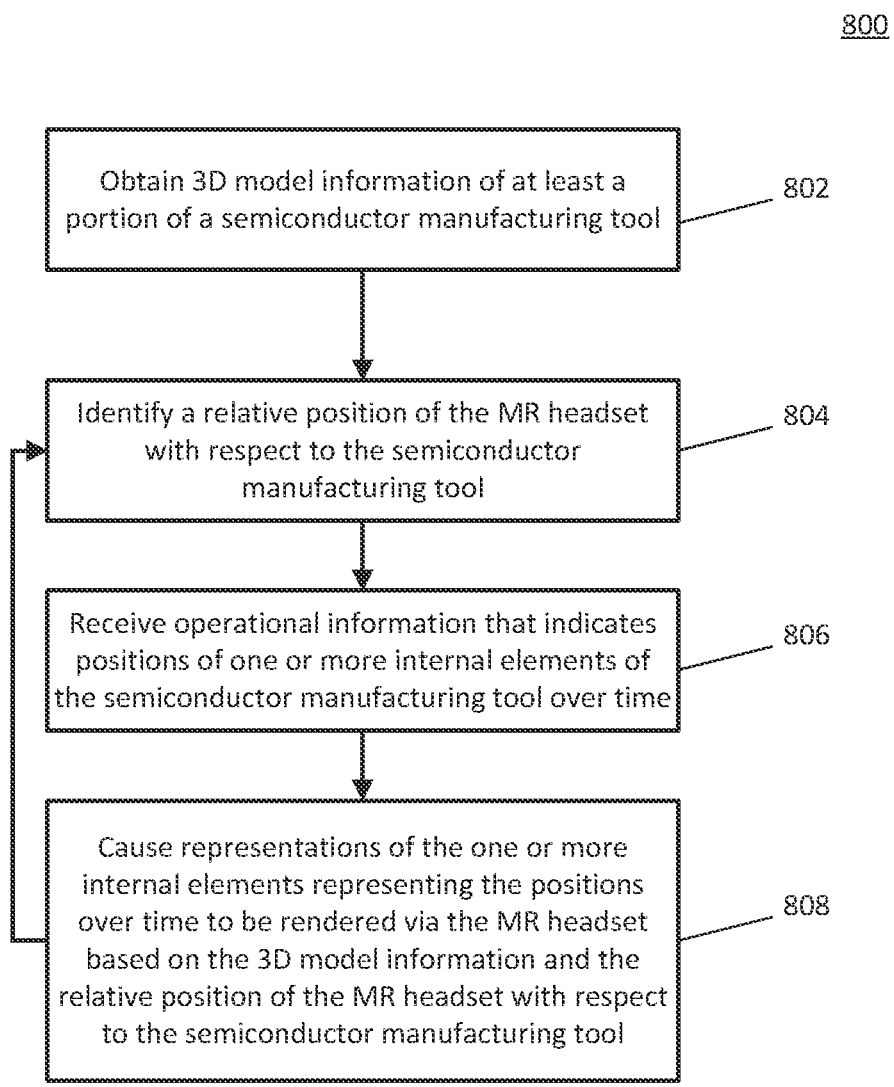
FIGS. 8A and 8B show flowcharts that illustrate example processes for rendering representations of internal elements/components of semiconductor manufacturing tools via an MR headset in accordance with some embodiments.
Figure 8B:
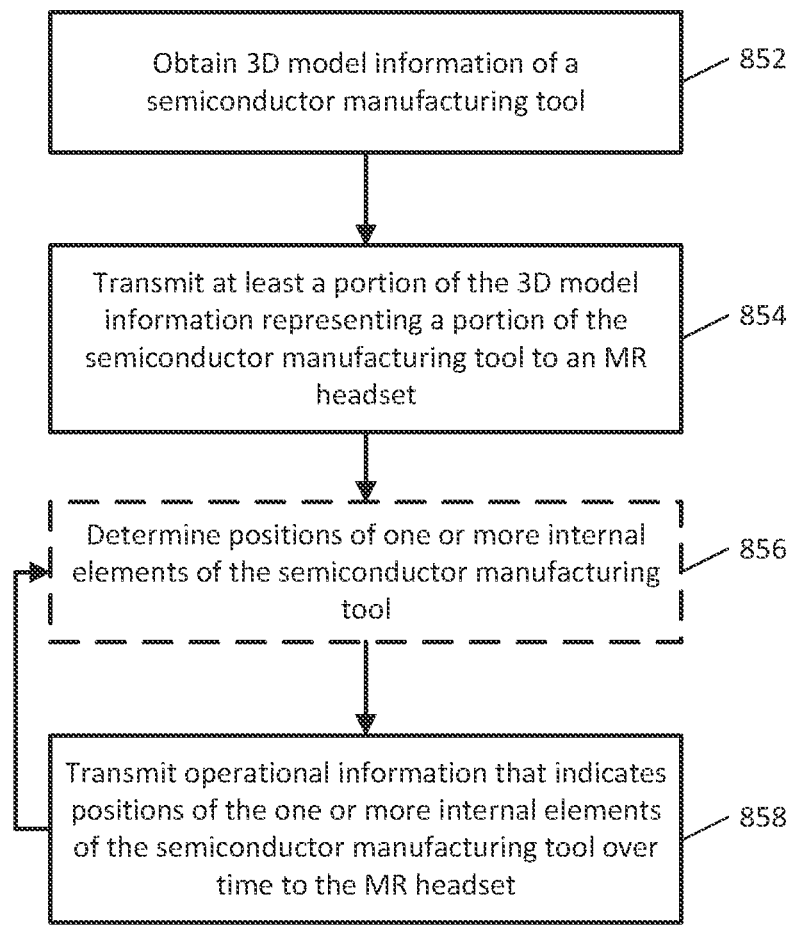
Figure 9A:
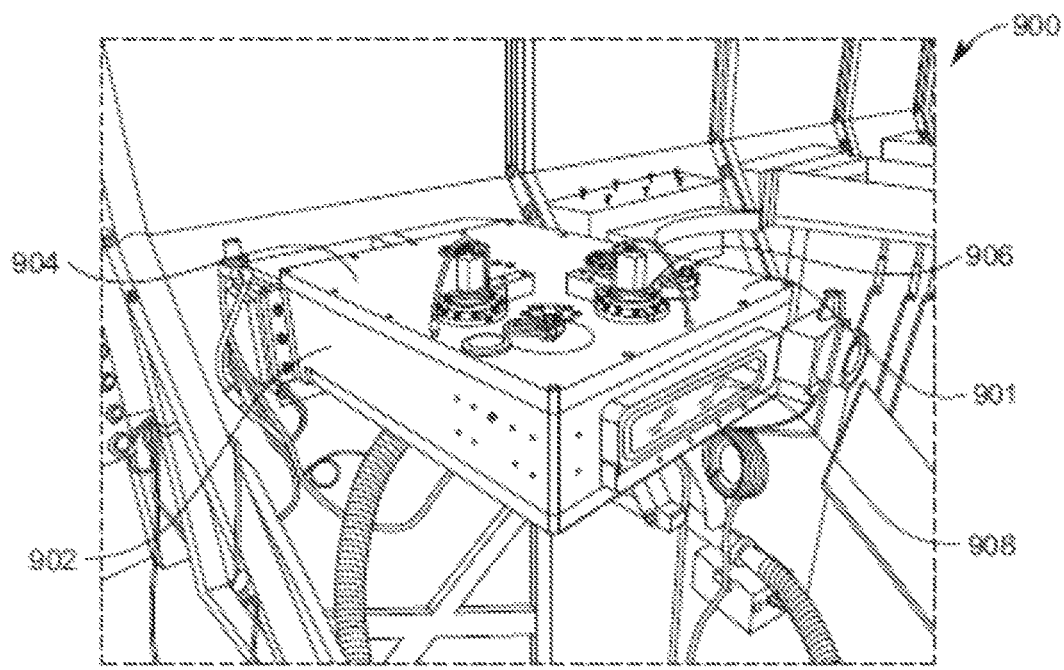
FIG. 9A shows a process chamber in an example view in accordance with some embodiments.
Figure 9B:
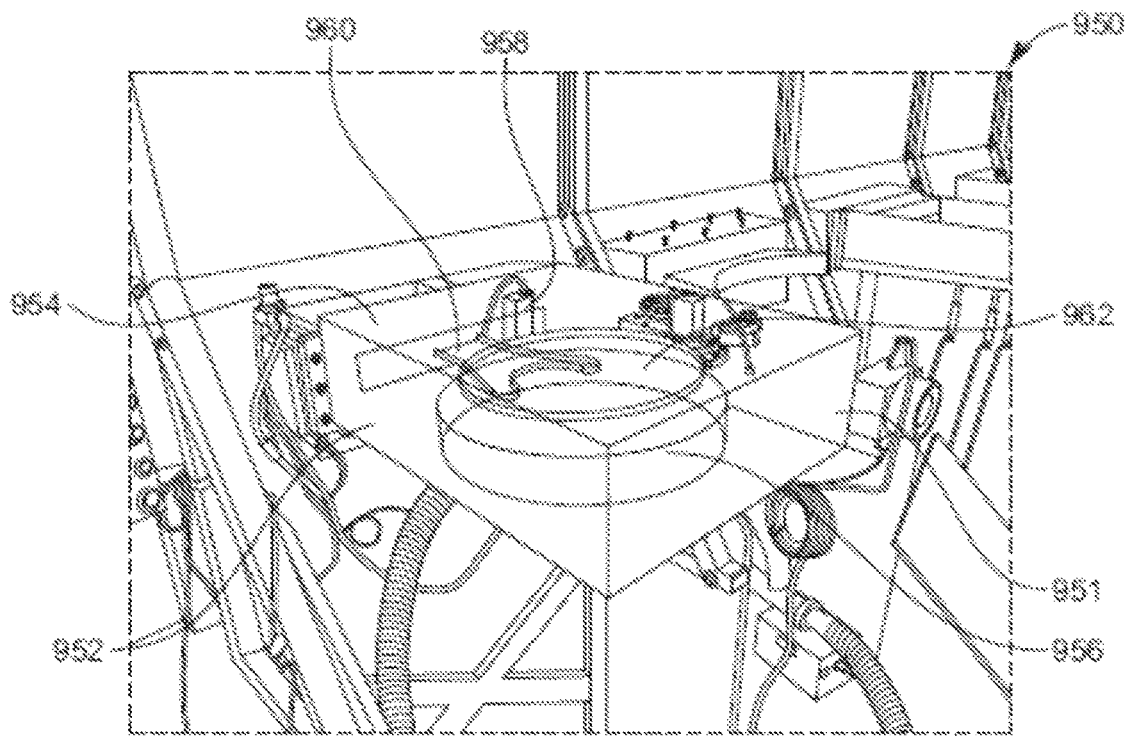
FIG. 9B shows an example view of 3D images of internal elements/components rendered in an AR, VR, or MR environment in accordance with some embodiments.

FIG. 8A shows an example process 800 for rendering, by an MR headset, representations of internal elements/components of a semiconductor manufacturing tool in accordance with some embodiments. FIG. 8B shows an example process 850 for providing and obtaining, by an MR control system, information for rendering representations of internal elements/components of a semiconductor according to certain embodiments. FIGS. 9A and 9B show illustrative views of 3D presentations of a process chamber according to some embodiments.

Referring to FIG. 8A, blocks of process 800 may be executed by an MR headset in some embodiments. It should be noted that, in some embodiments, the blocks of process 800 shown in FIG. 8A can be performed in various orders and, in one or more of these blocks can be performed concurrently. Additionally, in some embodiments, one or more blocks of process 800 may be omitted. In some embodiments, process 800 may be executed subsequent to a communication channel between the MR headset and an MR control system being established.

At 802, the MR headset obtains 3D model information associated with at least a portion of a semiconductor manufacturing tool. As described above in connection with FIG. 2, the 3D model information can be stored in the MR headset, the MR control system, or systems in communication with the MR headset or the MR control system, such as an external server. The 3D model information may include but not limited to, 3D images of multiple components, associated geometry (e.g., polygons and their vertices), associated color or texture information, relevant coordinate information, lighting information (e.g., that indicates locations and/or positions of shadows), and more.

In some embodiments, the 3D model information may be stored in one or more computer-readable storage media (e.g., memory) of the MR headset. In such embodiments, the 3D model information may be retrieved by the MR headset from one or more of these computer-readable storage media. In some embodiments, the 3D model information may be stored in one or more computer-readable storage media (e.g., memory) of the MR control system. In such embodiments, relevant 3D model information may be provided to the MR headset by the MR control system as needed for rendering 3D content. In some embodiments, the 3D modeling information may be stored in multiple devices. For example, the coordinate information may be stored in the MR control system, but the geometry information is stored in the MR headset.

At 804, the MR headset identifies its own position and orientation relative to one or more fiducial marks of the semiconductor manufacturing tool according to some embodiments. One or more physical features of the semiconductor manufacturing/fabrication tool may serve as the fiducial marks. The MR headset may determine its relative position to the semiconductor manufacturing/fabrication tool using one or more onboard cameras or one or more onboard sensors. For example, image data obtained by the one or more cameras may be used to identify a position of a fiducial mark (e.g., a physical landmark) of the semiconductor manufacturing tool. In some embodiments, a position of a machine-readable code affixed to an external portion of the semiconductor manufacturing tool can be used by the MR headset to determine its relative position and orientation. In some embodiments, the relative position may be identified relative to a fiducial or a fiducial mark present in the physical environment, where the fiducial or fiducial mark is an external physical landmark of the semiconductor manufacturing tool (e.g., a particular screw, a particular wall, etc.) or is a machine-readable code affixed to an external portion of the semiconductor manufacturing tool.

One or more fiducial marks used to obtain a relative position of the semiconductor manufacturing tool with respect to the MR headset may correspond to known positions or locations within the three-dimensional model information. The fiducial marks can therefore be used to allow three-dimensional (3D) representations of components to be positioned, oriented, and/or scaled within a field of view (FOV) of the MR headset such that the 3D representation overlays where the physical component would be within the FOV and is shown in the FOV of the MR headset at a scale that is consistent with the scale that the real-world counterpart would have if it was visible from the perspective of the MR headset.

At 806, the MR headset receives, from the MR control system, operational information that indicates positions, or positions over time, of one or more internal elements/components of the semiconductor manufacturing tool. For example, the operational information may indicate position information of an element/component (e.g., a position of a robot arm, a position of an indexer or carousel, a position of a lift pin, a position of a showerhead, etc.) relative to a frame of reference that correlates with or is associated with the physical semiconductor manufacturing tool. As another example, the operational information may indicate movement information (e.g., speed and direction) of an element relative to the frame of reference that correlates with or is associated with the physical semiconductor manufacturing tool.

In some embodiments, the operational information may include sensor data for an element, such as pressure data, temperature data, and the like. In some such embodiments, the operational information can additionally indicate an anomalous state or an error state that is identified based on the sensor data. For example, the operational information can indicate that the MR control system has determined that particular sensor data is out of a normal range and is therefore anomalous or that a particular element is in an error state. In some embodiments, positional or rotational encoder information may be used to determine position information and/or movement information related to one or more internal elements/components. For example, a position of a robotic arm may be determined based on one or more rotational encoders that indicate a rotational amount of each joint of the robotic arms and based on a known length of each arm link.

In some embodiments, the operational information can indicate information about one or more wafers undergoing fabrication. For example, the operational information can indicate a position of a wafer within a particular process chamber, whether a particular wafer is currently clamped or declamped to a chuck, etc.

In some embodiments, the MR headset may determine the positions, or positions over time of the internal elements/components based on sensor data transmitted by the MR control system. In some embodiments, the MR headset may receive the positions or positions over time from the MR control system. In some embodiments, the MR headset may receive initial position information from the MR control system and may determine subsequent positions over time based on the initial position information using a script.

At 808, the MR headset renders the one or more internal elements/components in an MR, AR or VR environment. The positions, or positions over time, of the one or more internal elements/components may be rendered based on the 3D model information and based on the relative position of the MR headset with respect to the semiconductor manufacturing tool. An example of a view rendered via an MR headset that includes representations of one or more internal elements is shown in and described below in connection with FIG. 9B.

In some embodiments, one or more 3D images may be generated using the 3D model information. In some embodiments, each image corresponds to an internal element or a portion of an internal element to be rendered. In some embodiments, each of the one or more 3D images may be generated such that an orientation, positioning, and/or sizing of the 3D model in the image corresponds to a viewpoint of the MR headset with respect to the semiconductor manufacturing tool, where the viewpoint is determined based on the relative position of the MR headset to the semiconductor manufacturing tool.

In some embodiments, in instances in which two or more 3D images are generated, the two or more 3D images may be rendered in sequence. The sequenced two or more 3D images may therefore appear as an animation.

In some embodiments, the one or more 3D images may be generated and rendered based on a script that generates positions of various elements represented by the one or more 3D images. For example, in an instance in which the one or more 3D images represent a robotic arm, the script may be used to identify one or more positions of the robotic arm. In another example, in an instance in which the robotic arm is in motion, the script may be used to identify a series of positions of the robotic arm at a series of timepoints. Positions of various elements may be generated by the script based on a known manner in which the elements move. For example, positions of a robotic arm may be generated based on a known manner in which various links of the robotic arm rotate around one or more joints.

In some embodiments, representations of the positions, or positions over time, of the one or more internal elements/components may be presented in a manner that indicates a status of the corresponding internal component. For example, a component that is determined to be associated with anomalous sensor readings or that is in an error state may be rendered in a visual manner (e.g., in red, blinking, etc.) that indicates such a status.

Additionally, in some embodiments, status information may be conveyed via the MR headset in non-visual manners. For example, in some embodiments, audible alerts (e.g., beeps, tones, etc.) or audible messages may be presented via a speaker of the MR headset. Such alerts or messages may be presented in response to a determination that an element is in an error state or an anomalous state, that a particular element is in motion or is soon to be in motion, etc.

In some embodiments, manners in which an MR headset presents information related to the positions, or positions over time, of internal elements of the semiconductor manufacturing tool may be user-configured. For example, such user-configurations may be received via one or more user interfaces used to set and modify settings associated with the MR headset. In some embodiments, the function for rendering 3D images of components/elements can be activated or deactivated by a user via the MR headset using various command/input mechanisms disclosed by the present disclosure.

FIG. 8B shows an example process 850 for providing and obtaining information, by an MR control system, for rendering representations of internal elements/components of a semiconductor manufacturing tool in accordance with some embodiments. In some embodiments, the blocks of process 850 shown in FIG. 8B can be performed in various orders and some blocks may be performed concurrently. In some embodiments, one or more blocks of process 850 may be omitted. In some embodiments, process 850 is performed subsequent to an establishment of a communication channel between the MR headset and an MR control system.

At 852, the MR control system obtains 3D model information associated with a semiconductor manufacturing tool. In some embodiments, the 3D model information may be stored in memory associated with the MR control system. In some embodiments, the MR control system may retrieve the 3D model information from a server.

At 854, the MR control system transmits at least a portion of the 3D model information representing a portion of the semiconductor manufacturing tool to the MR headset. In some embodiments, the MR control system may identify the portion of the 3D model information to be transmitted based on an indication of the portion of the semiconductor manufacturing tool that is within a field of view of the MR headset.

At 856, the MR control system determines positions or positions over time of one or more internal elements of the semiconductor manufacturing tool. The positions or positions over time may be based on sensor data received from the semiconductor manufacturing tool. For example, a position of a robotic arm may be determined based on a value of an encoder. In some embodiments, the positions or positions over time may be based on a known model of how links of the robotic arm move.

In some embodiments, the MR control system can transmit sensor data to the MR headset (e.g., at block 858) without determining position information. In some such embodiments, block 856 may be omitted. In some embodiments, the MR control system may determine initial positions of the one or more elements/components based on sensor data received from the semiconductor manufacturing tool. In some such embodiments, the MR headset may determine positions over time of the one or more elements based on the initial position(s).

At 858, the MR control system transmits positional/location information that indicates positions of the one or more internal elements/components of the semiconductor manufacturing tool to the MR headset. In some embodiments, the positional/location information may include the positions or positions over time of the one or more internal elements/components determined at block 856. In some embodiments, the positional/location information may include sensor data (e.g., from an encoder, or the like) from which the MR headset can determine the position information.

FIG. 9A shows a processing chamber 901 in an example view 900. As illustrated, view 900 includes the processing chamber 901 that has opaque side walls 902 and top wall 904. Processing chamber 901 also includes sensors, such as sensors 906, which may be on a top portion of processing chamber 901. Processing chamber 901 also includes a front facing wafer loading slot 908. Additionally, view 900 includes a view of the physical environment (e.g., a room) in which the processing chamber 901 is located. View 900 may be visible in the field of view of an MR headset when no virtual content is overlaid on the user's field of view.

FIG. 9B shows an example view 950 that illustrates how a 3D image of an internal elements/components could be rendered in an AR, VR or MR environment. As illustrated, in view 950, the walls of a virtual processing chamber 951 are rendered as transparent walls 952 and 954. The virtual processing chamber 951 is a virtual representation of the process chamber 901 shown in FIG. 9A. Additionally, representations of internal equipment components or elements are rendered within the transparent walls 952 and 954. For example, view 950 shows a virtual pedestal 956, a virtual wafer loading slot 958, and a virtual wafer handling robot end effector 960 representing the actual physical components in the semiconductor tool. Additionally, view 950 shows a virtual wafer 962 that is positioned on top of the virtual wafer handling robot end effector 960. The position and orientation of the virtual wafer 962 and the virtual wafer handling robot end effector 960 reflects the actual position and orientation of the respective components within the semiconductor manufacturing tool near real-time. As illustrated, portions of the physical environment (e.g., the room) in which the virtual processing chamber 951 is rendered remain visible in the rendering environment (e.g., AR rendering environment). In some embodiments, the virtual 3D rendering of various internal elements/components are overlaid on a realistic projection of the actual physical object. In some embodiments, the rendered objects are programmed to visually replace the projected actual corresponding objects in the rendering environment. For example, in FIG. 9B, the virtual processing chamber 951 visually replaced the projected actual processing chamber 901 in FIG. 9A. In some embodiments, features of an actual object are selectively rendered, so that components/elements that are not of interest are not rendered. For example, the virtual processing chamber 951 in FIG. 9B does not show the sensors 906 on the top wall and the front facing wafer loading slot 908 of the actual processing chamber 901 as shown in FIG. 9A.

Interacting with Digital Twins Using an MR Headset

In some embodiments, an MR headset can be used to render virtual reality (VR) content associated with a digital twin of a physical semiconductor manufacturing tool. According to some embodiments, the digital twin is a virtual representation or simulation of the physical semiconductor manufacturing tool. In some embodiments, by rendering virtual reality content associated with a digital twin that represents a physical semiconductor manufacturing tool, the MR headset can allow a wearer of the MR headset to interact with a virtual representation of the physical semiconductor manufacturing tool. For example, the wearer may be able to start or initiate various processes on the digital twin, observe and analyze sensor outputs as a result of various inputs and system changes, observe instructions or parameter values that lead to particular error conditions, or the like. In some embodiments, new users may benefit from interacting and training with a digital twin via an MR headset before performing operations on a physical semiconductor manufacturing tool.

In some embodiments, the digital twin is in communication with an MR control system that issues instructions to the digital twin to simulate particular semiconductor manufacturing tool operations and receives output from the digital twin that reflects simulated values and states of the semiconductor manufacturing tool provided by the digital twin. As described above, it should be noted that the MR control system that communicates with the digital twin may be installable and/or operable to communicate with a physical semiconductor manufacturing tool. In some embodiments, the digital twin directly communicates with an MR headset without the MR control system.

In some embodiments, the MR headset can receive operational information from the MR control system that indicates, for example, state information of various components of the digital twin, simulated sensor values associated with simulated sensors of the digital twin, and the like. In some embodiments, the MR headset may receive the same or similar operation information directly from the digital twin. In some embodiments, the MR headset is configured to render content in an MR environment that represents the received operational information.

Figure 10:
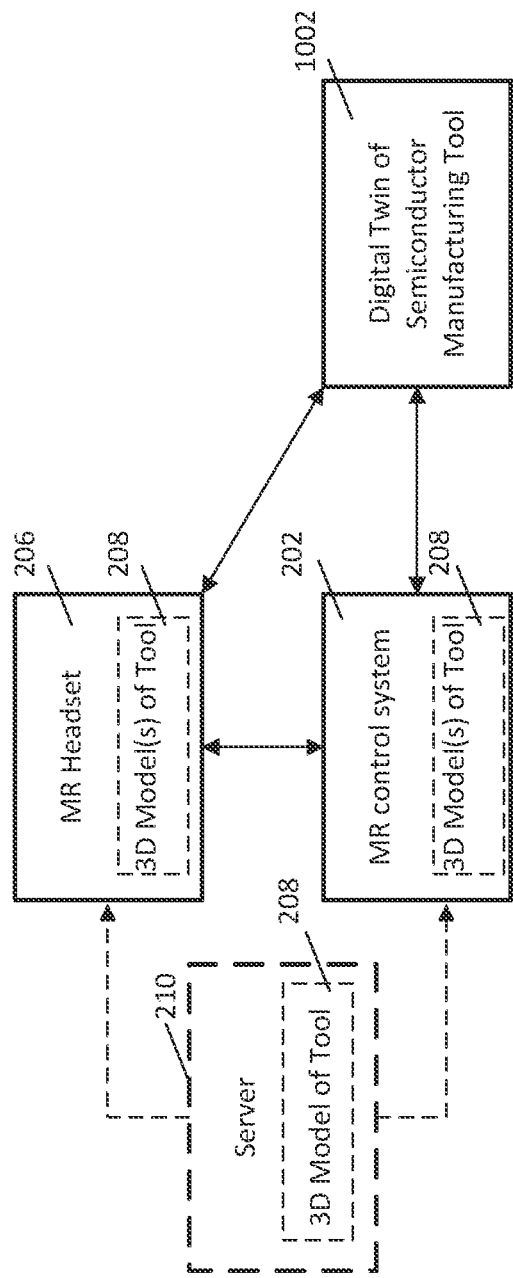
FIG. 10 shows a schematic diagram of an example system for rendering semiconductor manufacturing tool operational information from a digital twin of a semiconductor manufacturing tool in accordance with some embodiments.

FIG. 10 illustrates an example schematic diagram of a system for rendering semiconductor manufacturing tool operational information from a digital twin of a semiconductor manufacturing tool using an MR headset in accordance with some embodiments.

As illustrated, MR control system 202 is in communication with a device that executes a digital twin 1002. In some embodiments, MR control system 202 is integrated within the digital twin 1002. In some embodiments, communication between MR control system 202 and digital twin 1002 may use a TCP-based protocol, an IP-based protocol, etc. The communication may be wired or wireless. In some embodiments, tool control product software executing on MR control system 202 provides instructions to digital twin 1002 that cause digital twin 1002 to simulate various semiconductor manufacturing tool operations. In some embodiments, MR control system 202 can receive information from a device that executes digital twin 1002. For example, MR control system 202 can receive information that indicates simulated sensor values, simulated state information, and the like.

Digital twin 1002 may include various algorithms that simulate various components or aspects of a semiconductor manufacturing tool. For example, digital twin 1002 may include digital or computation models of elements used to simulate multiple components within a semiconductor manufacturing/fabrication tool, including but not limited to a pedestal of an electrostatic chuck, a showerhead of a process chamber, a robotic arm that moves a wafer from a first process chamber to a second process chamber, etc. In some embodiments components of digital twin 1002 may be coupled or linked within the digital twin such that components can interact with each other. For example, a digital component that simulates a showerhead may interact with a digital component that simulates a wafer such that wafer properties or parameters controlled by the simulation of the wafer may change based on the simulation of the showerhead.

In some embodiments, MR control system 202 can interact with digital twin 1002 to initiate and/or control simulation of one or more fabrication operations. For example, MR control system 202 can be used to set or adjust setpoints of digital twin 1002, initiate a particular simulated action (e.g., initiating a simulated vacuum operation, initiating a simulated temperate change operation, initiating a simulated gas flow operation, etc.), obtain or retrieve parameter values of digital twin 1002 (e.g., a current simulated temperature, a current simulated pressure level, a current simulated gas flow rate, etc.), and the like.

Similar to what is shown in and described above in connection with FIG. 2, one or more three-dimensional models 208 of a physical semiconductor manufacturing tool represented by digital twin 1002 can be stored in memory of MR headset 206 and/or in memory of MR control system 202. Additionally or alternatively, three-dimensional models 208 may be stored on server 210 that can be configured to provide one or more of three-dimensional models 208 to MR headset 206 and/or MR control system 202 in response to a request.

Figure 11A:
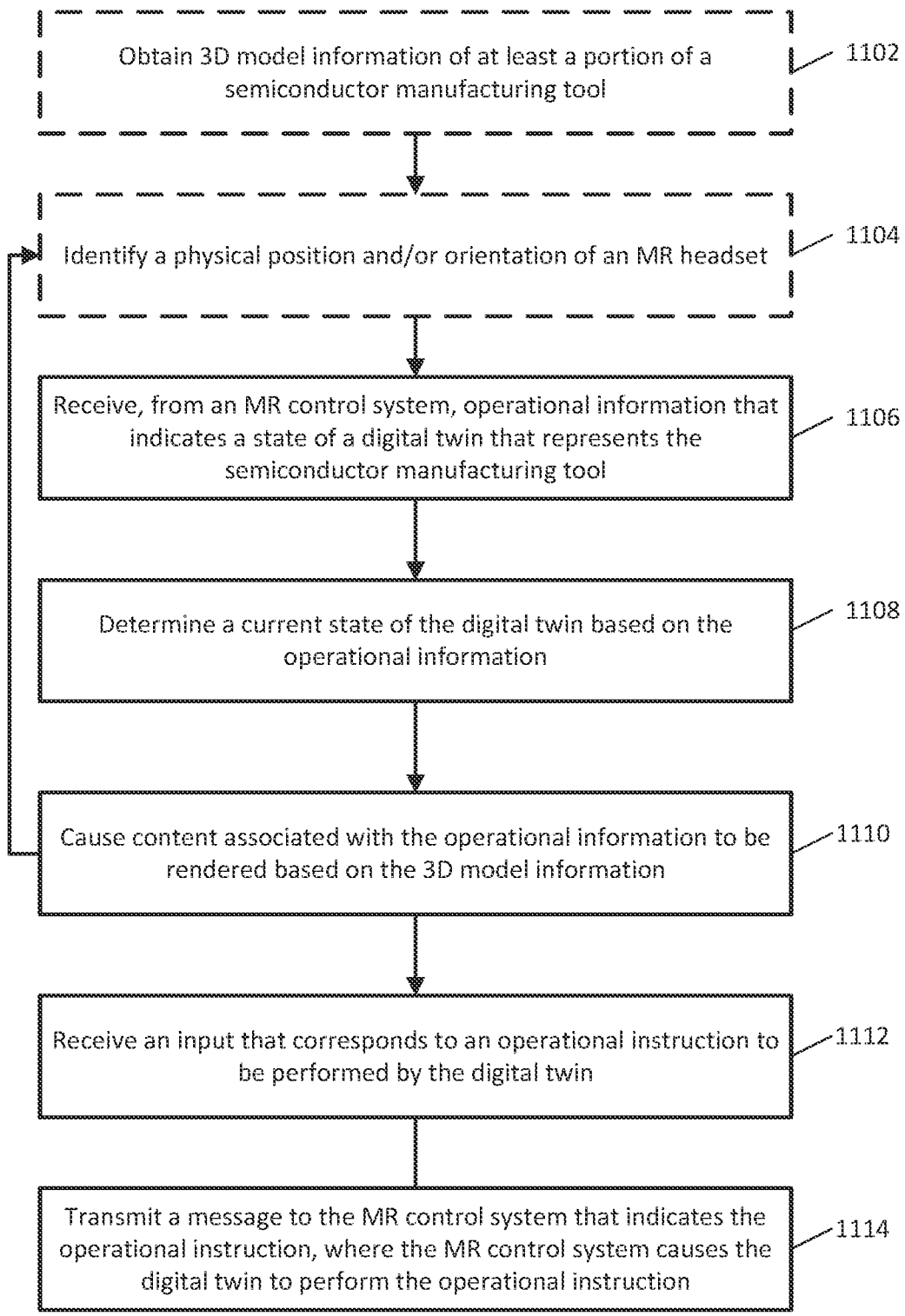
FIGS. 11A and 11B show flowcharts that illustrate example processes for rendering content associated with a digital twin of a semiconductor manufacturing tool in accordance with some embodiments.

FIG. 11A shows an example process 1100 for rendering content associated with a digital twin of a semiconductor manufacturing tool in accordance with some embodiments. In some embodiments, blocks of process 1100 may be performed by an MR headset that is in communication with an MR control system that is in communication with the digital twin, performed by an MR headset in direct communication with the digital twin. It should be noted that, in some embodiments, the blocks of process 1100 shown in FIG. 11A can be performed in various orders and, in the case of some blocks, performed concurrently. Additionally, in some embodiments, one or more blocks of process 1100 may be omitted. In some embodiments, process 1100 may be performed subsequent to establishment of a communication channel between the MR headset and the MR control system, or the MR headset and the digital twin. In some embodiments, the MR headset renders all the content associated with the digital twin (e.g., operational information, process simulation, and control panels, etc.) in a complete VR environment.

In some embodiments, at 1102, the MR headset obtains 3D model information associated with at least a portion of the semiconductor manufacturing tool represented by the digital twin. The 3D model information may include 3D model information for any suitable components or parts of the semiconductor manufacturing tool. In some embodiments, the 3D model information that is retrieved may be a portion of 3D model information that pertains to particular components or elements of the semiconductor manufacturing tool. For example, 3D model information for a particular robotic arm, a particular pedestal, a particular showerhead, etc. may be obtained.

In some embodiments, 1102 may be omitted. For example, in some embodiments, one or more control panels (e.g., that include UI elements for presenting virtual sensor values or other data) may be rendered in 2D without rendering 3D representations of components of the semiconductor manufacturing tool represented by the digital twin.

The 3D model information may be retrieved from memory of the MR headset. Additionally or alternatively, the 3D model information may be received at the MR headset from memory associated with the MR control system, or digital twin via the respective communication channel.

In some embodiments, at 1104, the MR headset identifies a physical position and/or an orientation of the MR headset. The physical position and/or the orientation of the MR headset may be identified based on one or more cameras of the MR headset and/or based on one or more sensors (e.g., an accelerometer, a gyroscope, etc.) of the MR headset. The physical position and/or the orientation of the MR headset may be identified with respect to the physical environment the MR headset is physically located in. For example, the physical position and/or the orientation may be determined with respect to physical landmarks in the physical environment.

In some embodiments, 1104 can be omitted. For example, in some embodiments, target objects rendered by the MR headset may be rendered and/or updated based on user interactions and/or navigation within the virtual space. For example, a representation may be zoomed in or out based on explicit user input (e.g., pinching or pulling a rendered user interface element). In some embodiments, an operator's viewing angle may be changed by moving the FOV virtually using a direction command. Because the FOV has less restrictions in a virtual space, in some embodiments, more viewing angles can be realized. For example, an operator may be able to view a tool from underneath, which would be very difficult to do in some of the AR and MR environments described above. In some embodiments, certain operational/status data may be shown next to some or all the components shown in one screen. In these embodiments, an operator may be able to observe the impact from an input commands across multiple components at once.

At 1106, the MR headset receives operational information from the MR control system or the digital twin that indicates a state of the digital twin. For example, the operational information may include one or more simulated sensor values associated with simulated sensors of the digital twin. As another example, the operational information may include one or more simulated positions of various simulated components or internal elements of the semiconductor manufacturing tool represented by the digital twin.

At 1108, the MR headset determines a current state of the digital twin based on the operational information. For example, in some embodiments, the current state can be an error state or an anomalous state that is identified based on simulated sensor values being outside of a normal range. In some embodiments, the state determination is done at the MR control system or digital twin, so that the MR headset is merely rendering/presenting the received state information. In some embodiments, the simulated sensor values can correspond to simulated temperature values, simulated gas flow values, simulated pressure values, and the like.

In some embodiments, the current state can indicate position or motion information for one or more simulated components of the semiconductor manufacturing tool represented by the digital twin. For example, the position information can indicate a position of a simulated component with respect to a frame of reference that correlates with or is associated with the semiconductor manufacturing tool. In another example, the motion information can indicate, directly or indirectly, a direction of movement and/or a speed of movement or rotation of a simulated component with respect to one or more other simulated components of the semiconductor manufacturing tool or to a frame of reference that is fixed with respect to the simulated semiconductor manufacturing tool.

In some embodiments, the current state can indicate an operational status of one or more simulated components of the semiconductor manufacturing tool represented by the digital twin. For example, an operational status of an airlock can indicate whether the airlock is pumped or not. As another example, an operational status of a door can indicate whether the door is safe to close or not, whether the door is currently closed or not, etc. In another example, an operational status of a gas line can indicate whether gas is currently flowing through the gas line or not.

In some embodiments, information indicating the current state of the digital twin may be received by the MR headset from the MR control system. That is, in some embodiments, the MR control system may determine that the current state is an error state or an anomalous state, and the MR control system may then transmit information indicating the error state or the anomalous state to the MR headset. The MR headset may then render content indicating the error state or the anomalous state, e.g., at block 1110 of the process 1100.

At 1110, the MR headset causes content indicating the current state of the digital twin to be rendered. In some embodiments, the content may be rendered based on the 3D model information. For example, 3D images of one or more components or elements of the semiconductor manufacturing tool represented by the digital twin may be rendered.

In some embodiments, one or more 3D images representing the particular component may be generated and/or rendered such that the one or more 3D images are sized, positioned, and/or oriented in a manner that is consistent with 3D images of other components or elements of the semiconductor manufacturing tool represented by the digital twin. For example, in an instance in which the one or more 3D images correspond to a robotic arm that is in motion due to, e.g., an action that has been initiated to move the robotic arm, a script may be used to identify positions of the robotic arm over a series of time points. As a more particular example, positions of the robotic arm may be determined based on a known manner in which various links of the robotic arm rotate around joints, and the like. Continuing with this example, the one or more 3D images may correspond to representations of the robotic arm at each time point in the series of time points. Continuing still further with this example, the one or more 3D images may then be rendered in sequence such that the one or more 3D images appear to show an animated representation of the simulated robotic arm.

In some embodiments, the MR headset may be configured to update renderings of the 3D image continuously over time.

In some embodiments, the rendered content may be presented in 2D. For example, in some embodiments, one or more panels may be presented in 2D that display virtual sensor information, status information associated with the digital twin, or the like.

In some embodiments, the MR headset may be configured to present content representing an error state (if detected based on the operational information) or an operational status of one or more simulated components of the semiconductor manufacturing tool represented by the digital twin. For example, the MR headset may render 3D images that represent a component based on its operational status or based on a detected error state. Visual characteristics that can be used to indicate a detected error state or an operational status can include color, blinking, and the like.

In some embodiments, the MR headset may be configured to provide audible alerts or messages. For example, audible alerts (e.g., tones, beeps, etc.) or messages may be provided to indicate a detected error state or a particular operational status. As a more particular example, an audible message may be provided to indicate a change in an operational status, such as that a particular airlock is being pumped, that a particular door is being closed, etc.

In some embodiments, subsequent to block 1112, the MR headset may loop back to block 1104 and may identify an updated position and/or orientation of the MR headset. The rendered content may then be updated based on the updated position and/or orientation of the MR headset. In some embodiments, the rendered content may be updated without identifying position and/or orientation information of the MR headset. For example, in some embodiments, the rendered content may be updated based on a user interacting with the rendered content, such as by pinching or pulling rendered content to zoom in or out on rendered content.

In some embodiments, at block 1112, the MR headset receives an input that corresponds to an operational instruction to be performed by the digital twin. Examples of operational instructions may include but not limited to starting or initiating a process or step of a process, changing a state of a component or element of the digital twin (e.g., changing a particular airlock to switch to a venting state, closing a particular door, or the like), etc.

The input may be received via selection of a user interface element via the MR headset. For example, the user interface element may be presented within a menu of available operational instructions that may be performed.

At block 1114, the MR headset transmits a message to the MR control system that indicates the operational instruction generated from the input received at block 1112. The MR control may then cause the digital twin to perform the operational instructions, as described below in connection with block 1160 of FIG. 11B. In some embodiments, the MR headset transmits the message directly to the digital twin.

Figure 11B:
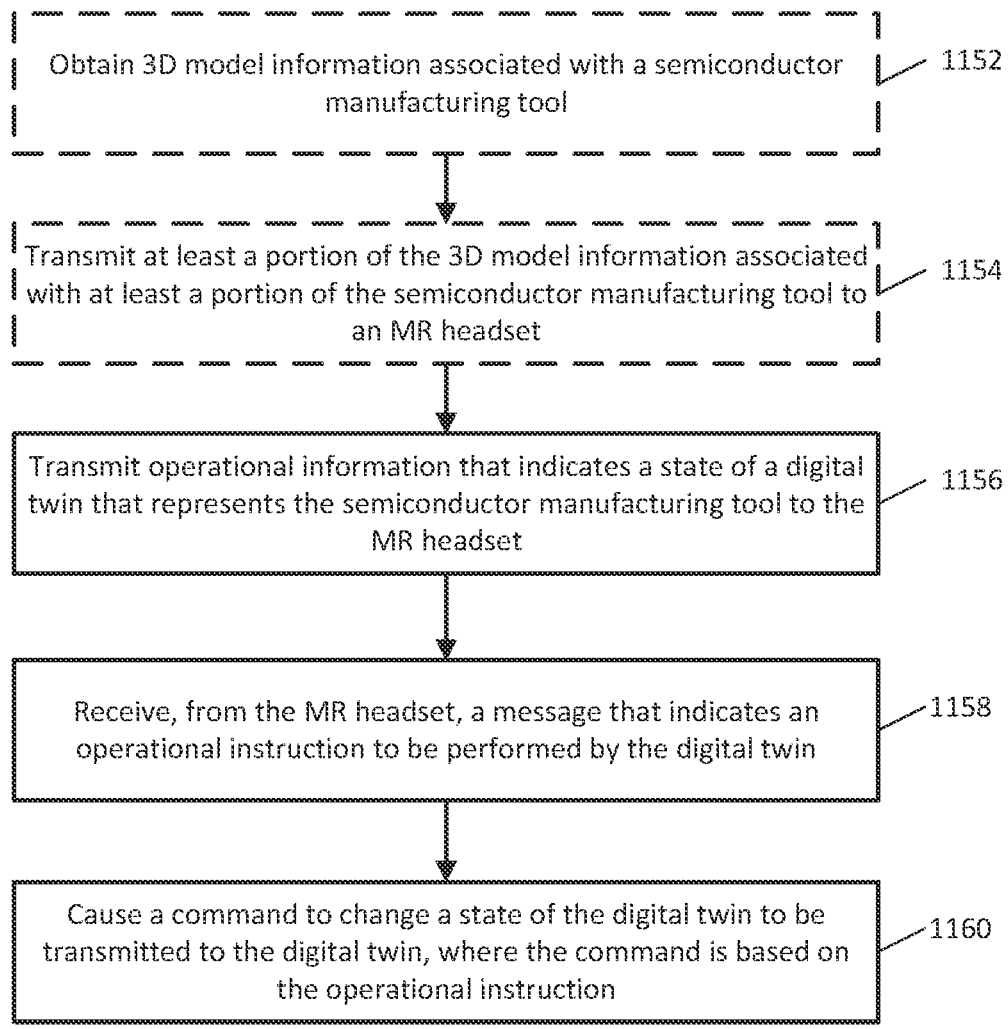

FIG. 11B shows an example process 1150 for providing, by an MR control system, operational information associated with a digital twin of a semiconductor manufacturing tool and causing operational instructions to be performed by the digital twin. It should be noted that, in some embodiments, the blocks of process 1150 shown in FIG. 11B can be performed in various orders and, in the case of some blocks, performed concurrently. Additionally, in some embodiments, one or more blocks of process 1150 may be omitted. In some embodiments, process 1150 may be performed subsequent to establishment of a communication channel between the MR headset and the MR control system. In some embodiments, the MR control system is integrated in the digital twin.

In some embodiments, at 1152, the MR control system obtains 3D model information associated with a semiconductor manufacturing tool represented by the digital twin. In some embodiments, the 3D model information may be stored in memory associated with the MR control system. Additionally or alternatively, in some embodiments, the MR control system may retrieve the 3D model information from a server.

In some embodiments, 1152 may be omitted. For example, in instances in which the MR headset renders one or more control panels in 2D without rendering 3D representations of components of the semiconductor manufacturing tool represented by the digital twin, the MR control system may not obtain 3D model information.

In some embodiments, at 1154, the MR control system transmits at least a portion of the 3D model information representing a portion of the semiconductor manufacturing tool to the MR headset. In some embodiments, the MR control system may identify the portion of the 3D model information to be transmitted based on an indication of a portion of a virtual representation of the semiconductor manufacturing tool that is within a field of view of the MR headset.

In some embodiments, 1154 may be omitted. For example, in instances in which the MR headset renders content in 2D, the MR control system may not transmit 3D model information to the MR headset.

At 1156, the MR control system transmits operational information that indicates a state of the digital twin. For example, the operational information may include one or more simulated sensor values associated with simulated sensors of the digital twin. As another example, the operational information may include one or more simulated positions of various simulated components or internal elements of the semiconductor manufacturing tool represented by the digital twin.

At 1158, the MR control system receives, from the MR headset, a message that indicates an operational instruction to be performed by the digital twin. Examples of operational instructions include starting or initiating a process or step of a process, changing a state of a component or element of the digital twin (e.g., changing a particular airlock to switch to a venting state, closing a particular door, or the like), etc.

At 1160, the MR control system causes a command to be transmitted to the digital twin, where the command changes a state of the digital twin and where the command is based on the operational instruction. For example, in some embodiments, the command may be transmitted using via a TCP message.

Context for Disclosed Computational Embodiments

Certain embodiments disclosed herein relate to computational systems working together to render control and status information associated with a semiconductor manufacturing/fabrication tool in MR environments, VR environments, AR environments, or a combination thereof. Such systems may also be configured to receive data and instructions such as program code representing physical processes occurring during the semiconductor device fabrication operation, sensor data, etc.

Many types of computing systems having any of various computer architectures may be employed as the disclosed systems for implementing machine learning models and algorithms for generating and/or optimizing such models. For example, the systems may include software components executing on one or more general purpose processors or specially designed processors such as Application Specific Integrated Circuits (ASICs) or programmable logic devices (e.g., Field Programmable Gate Arrays (FPGAs)). Further, the systems may be implemented on a single device or distributed across multiple devices. The functions of the computational elements may be merged into one another or further split into multiple sub-modules.

In some embodiments, code executed during communication with various devices and/or rendering of various content on an appropriately programmed system can be embodied in the form of software elements which can be stored in a nonvolatile storage medium (such as optical disk, flash storage device, mobile hard disk, etc.), including a number of instructions for making a computer device (such as personal computers, servers, network equipment, etc.).

At one level a software element is implemented as a set of commands prepared by the programmer/developer. However, the module software that can be executed by the computer hardware is executable code committed to memory using "machine codes" selected from the specific machine language instruction set, or "native instructions," designed into the hardware processor. The machine language instruction set, or native instruction set, is known to, and essentially built into, the hardware processor(s). This is the "language" by which the system and application software communicates with the hardware processors. Each native instruction is a discrete code that is recognized by the processing architecture and that can specify particular registers for arithmetic, addressing, or control functions; particular memory locations or offsets; and particular addressing modes used to interpret operands. More complex operations are built up by combining these simple native instructions, which are executed sequentially, or as otherwise directed by control flow instructions.

The inter-relationship between the executable software instructions and the hardware processor is structural. In other words, the instructions per se are a series of symbols or numeric values. They do not intrinsically convey any information. It is the processor, which by design was preconfigured to interpret the symbols/numeric values, which imparts meaning to the instructions.

The processes and methods described herein may be configured to execute on a single machine at a single location, on multiple machines at a single location, or on multiple machines at multiple locations. When multiple machines are employed, the individual machines may be tailored for their particular tasks. For example, operations requiring large blocks of code and/or significant processing capacity may be implemented on large and/or stationary machines.

In addition, certain embodiments relate to tangible and/or non-transitory computer readable media or computer program products that include program instructions and/or data (including data structures) for performing various computer-implemented operations. Examples of computer-readable media include, but are not limited to, semiconductor memory devices, phase-change devices, magnetic media such as disk drives, magnetic tape, optical media such as CDs, magneto-optical media, and hardware devices that are specially configured to store and perform program instructions, such as read-only memory devices (ROM) and random access memory (RAM). The computer readable media may be directly controlled by an end user or the media may be indirectly controlled by the end user. Examples of directly controlled media include the media located at a user facility and/or media that are not shared with other entities. Examples of indirectly controlled media include media that is indirectly accessible to the user via an external network and/or via a service providing shared resources such as the "cloud." Examples of program instructions include both machine code, such as produced by a compiler, and files containing higher level code that may be executed by the computer using an interpreter.

In various embodiments, the data or information employed in the disclosed methods and apparatus is provided in an electronic format. Such data or information may include sensor data, parameter values, and the like. As used herein, data or other information provided in electronic format is available for storage on a machine and transmission between machines. Conventionally, data in electronic format is provided digitally and may be stored as bits and/or bytes in various data structures, lists, databases, etc. The data may be embodied electronically, optically, etc.

In some embodiments, various aspects described herein may be implemented as system software. System software typically interfaces with computer hardware and associated memory. In some embodiments, the system software includes operating system software and/or firmware, as well as any middleware and drivers installed in the system. The system software provides basic non-task-specific functions of the computer. In contrast, the modules and other application software are used to accomplish specific tasks. Each native instruction for a module is stored in a memory device and is represented by a numeric value.

Figure 12:
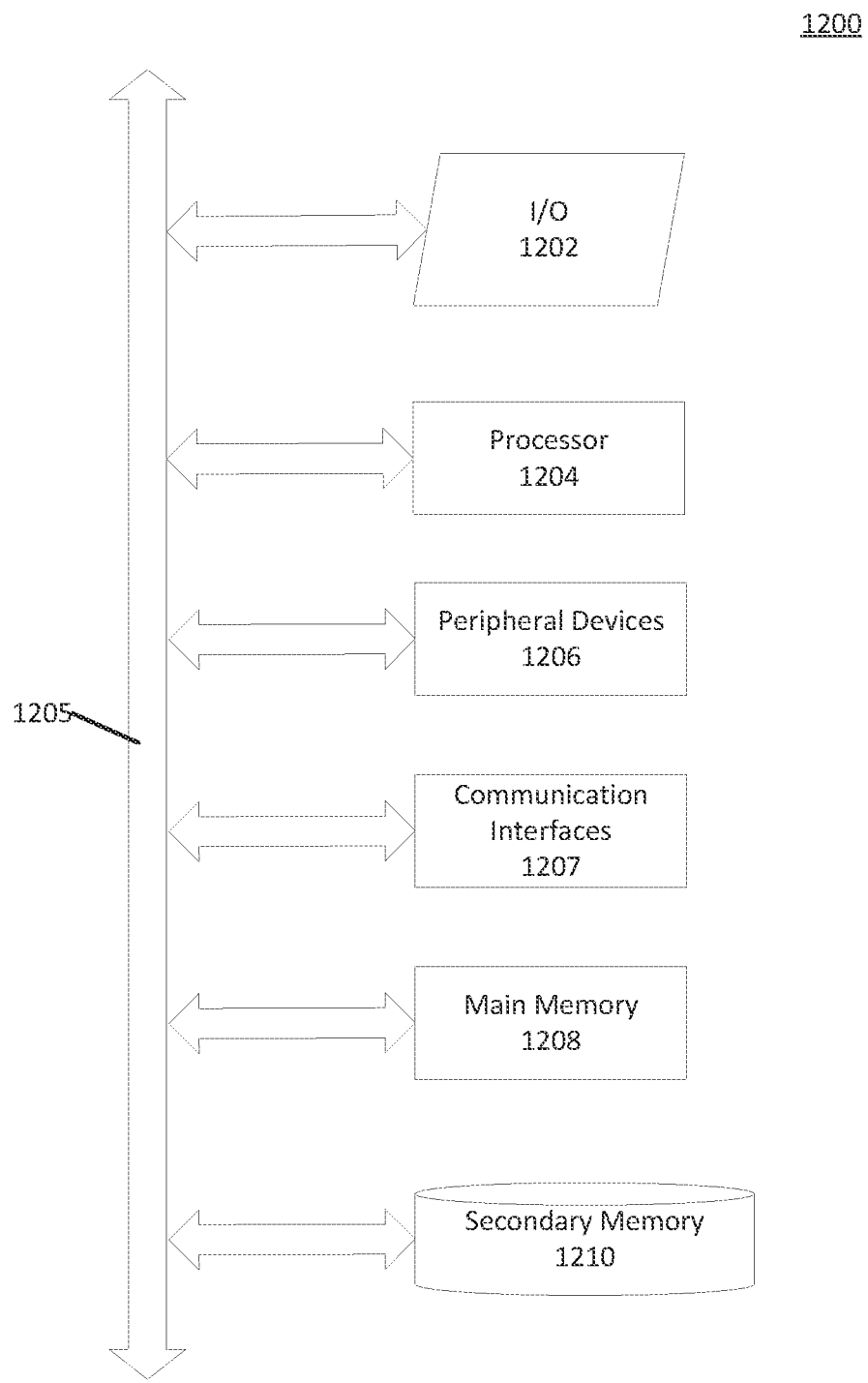
FIG. 12 presents an example computer system that may be employed to implement certain embodiments described herein.

An example computer system 1200 is depicted in FIG. 12. As shown, computer system 1100 includes an input/output subsystem 1202, which may implement an interface for interacting with human users and/or other computer systems depending upon the application. Embodiments of the disclosure may be implemented in program code on system 1200 with I/O subsystem 1202 used to receive input program statements and/or data from a human user (e.g., via a GUI or keyboard) and to display them back to the user. The I/O subsystem 1202 may include, e.g., a keyboard, mouse, graphical user interface, touchscreen, virtual command panel, or other interfaces for input, and, e.g., an LED or other flat screen display, or other interfaces for output.

Communication interfaces 1207 can include any suitable components or circuitry used for communication using any suitable communication network (e.g., the Internet, an intranet, a wide-area network (WAN), a local-area network (LAN), a wireless network, a virtual private network (VPN), and/or any other suitable type of communication network). For example, communication interfaces 1207 can include network interface card circuitry, wireless communication circuitry, etc.

Program code may be stored in non-transitory media such as secondary memory 1210 or memory 1208 or both. In some embodiments, secondary memory 1210 can be persistent storage. One or more processors 1204 reads program code from one or more non-transitory media and executes the code to enable the computer system to accomplish the methods performed by the embodiments herein. Those skilled in the art will understand that the processor may accept source code, such as statements for executing training and/or modelling operations, and interpret or compile the source code into machine code that is understandable at the hardware gate level of the processor. A bus 1205 couples the I/O subsystem 1202, the processor 1204, peripheral devices 1206, communication interfaces 1207, memory 1208, and secondary memory 1210. Devices, systems, platforms described here (e.g., MR rendering device (MR headset) and MR control system) may embody one or more elements described above.

Various computational elements including processors, memory, instructions, routines, models, or other components may be described or claimed as "configured to" perform a task or tasks. In such contexts, the phrase "configured to" is used to connote structure by indicating that the component includes structure (e.g., stored instructions, circuitry, etc.) that performs the task or tasks during operation. As such, the unit/circuit/component can be said to be configured to perform the task even when the specified component is not necessarily currently operational (e.g., is not on).

The components used with the "configured to" language may refer to hardware—for example, circuits, memory storing program instructions executable to implement the operation, etc. Additionally, "configured to" can refer to generic structure (e.g., generic circuitry) that is manipulated by software and/or firmware (e.g., an FPGA or a general-purpose processor executing software) to operate in manner that is capable of performing the recited task(s). Additionally, "configured to" can refer to one or more memories or memory elements storing computer executable instructions for performing the recited task(s). Such memory elements may include memory on a computer chip having processing logic. In some contexts, "configured to" may also include adapting a manufacturing process (e.g., a semiconductor fabrication facility) to fabricate devices (e.g., integrated circuits) that are adapted to implement or perform one or more tasks.

In the description, numerous specific details were set forth in order to provide a thorough understanding of the presented embodiments. The disclosed embodiments may be practiced without some or all of these specific details. In other instances, well-known process operations were not described in detail to not unnecessarily obscure the disclosed embodiments. While the disclosed embodiments were described in conjunction with the specific embodiments, it will be understood that the specific embodiments are not intended to limit the disclosed embodiments.

Unless otherwise indicated, the method operations and device features disclosed herein involves techniques and apparatus commonly used in metrology, semiconductor device fabrication technology, software design and programming, and statistics, which are within the skill of the art.

Unless defined otherwise herein, all technical and scientific terms used herein have the same meaning as commonly understood by one of ordinary skill in the art. Various scientific dictionaries that include the terms included herein are well known and available to those in the art. Although any methods and materials similar or equivalent to those described herein find use in the practice or testing of the embodiments disclosed herein, some methods and materials are described.

Numeric ranges are inclusive of the numbers defining the range. It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

The headings provided herein are not intended to limit the disclosure.

As used herein, the singular terms "a," "an," and "the" include the plural reference unless the context clearly indicates otherwise. The term "or" as used herein, refers to a non-exclusive or, unless otherwise indicated.

What is claimed is:

1. A Mixed Reality (MR) headset configured to control a semiconductor manufacturing tool in an MR environment, the MR headset comprising:
   one or more processors;
   a display coupled to the one or more processors;
   one or more cameras; and
   one or more memories storing computer-executable instructions which, when executed, cause the one or more processors to:
      establish a wireless communication channel with an MR control system of a semiconductor manufacturing tool;
      receive operational information associated with the semiconductor manufacturing tool from the MR control system via the wireless communication channel, wherein the operational information comprises sensor data obtained from one or more sensors of the semiconductor manufacturing tool; and
      cause content associated with the sensor data and one or more control features to be rendered in an MR environment.

2. The MR headset of claim 1, wherein the instructions, when executed, further cause the one or more processors to initiate the establishment of the wireless communication channel by:
   identifying a wireless access point associated with the MR control system and a password associated with the wireless access point; and
   connecting to the wireless access point using the password.

3. The MR headset of claim 2, wherein the instructions, when executed, further cause the one or more processors to identify the wireless access point by:
   obtaining image data via a camera of the one or more cameras;
   identifying a machine-readable code in the image data;
   decoding the machine-readable code to retrieve encrypted information; and
   decrypting the encrypted information using key information stored in the memory, wherein the decrypted information includes an identifier of the wireless access point and the password.

4. The MR headset of claim 1, wherein the instructions, when executed, further cause the one or more processors to identify a physical position and an orientation of the MR headset based on data from one or more sensors of the MR headset, wherein the content is rendered from a perspective that is based on the identified physical position and orientation of the MR headset.

5. The MR headset of claim 1, wherein the instructions, when executed, further cause the one or more processors to:
   receive an input that indicates second operational information associated with the semiconductor manufacturing tool, wherein the second operational information is different at least in part from the operational information; and
   cause a request for the second operational information to be transmitted to the MR control system;
   receive the second operational information from the MR control system; and
   cause second content associated with the second operational information to be rendered.

6. The MR headset of claim 5, wherein the input that indicates the second operational information indicates at least one of: a selection of a selectable input included in a menu rendered by the MR headset; or that the second operational information is generated based on an image capture of a machine-readable code that identifies the second operational information.

7. The MR headset of claim 5, wherein the rendered content comprises a user interface element that presents second sensor data obtained from the one or more sensors of the semiconductor manufacturing tool, and wherein the second sensor data corresponds to the requested second operational information.

8. The MR headset of claim 7, wherein the instructions, when executed, further cause the one or more processors to:
   receive a second input that indicates that the user interface element is to be fixed at a spatial coordinate with respect to the semiconductor manufacturing tool;
   identify a group of spatial coordinates in a coordinate system that is fixed with respect to the semiconductor manufacturing tool, wherein the group of spatial coordinates indicate borders of the user interface element with respect to a fixed spatial coordinate;
identify a physical position and an orientation of the MR headset relative to the coordinate system; and
modify presentation of the user interface element based on the physical position and the orientation of the MR headset relative to the fixed spatial coordinate.

9. The MR headset of claim 1, wherein the instructions, when executed, further cause the one or more processors to:
receive three-dimensional model information associated with the semiconductor manufacturing tool as part of the operational information;
identify a physical position and orientation of the MR headset relative to the semiconductor manufacturing tool; and
cause a three-dimensional representation of one or more elements of the semiconductor manufacturing tool to be rendered based on: 1) the three-dimensional model information and 2) the physical position and orientation of the MR headset relative to the semiconductor manufacturing tool as part of the rendered content associated with the operational information in the MR environment.

10. The MR headset of claim 9, wherein the operational information comprises positions of one or more internal elements of the semiconductor manufacturing tool over time, and wherein the rendered content comprises representations of the positions of the one or more internal elements of the semiconductor manufacturing tool over time relative to the semiconductor manufacturing tool.

11. The MR headset of claim 10, wherein the instructions, when executed, further cause the one or more processors to render the content by:
generating one or more three-dimensional images representing the one or more internal elements using the three-dimensional model information; and
causing the one or more three-dimensional images to be rendered by the MR headset based on the positions of the one or more internal elements relative to the semiconductor manufacturing tool.

12. The MR headset of claim 1, wherein the instructions, when executed further cause the one or more processors to:
receive three-dimensional model information associated with the semiconductor manufacturing tool as part of the operational information; and
cause the content to be rendered based on the three-dimensional model information, wherein the rendered content comprises content indicative of a state of a component a digital twin represented by the three-dimensional model information, wherein the digital twin represents the semiconductor manufacturing tool.

13. A Mixed-Reality (MR) control system comprising:
one or more processors;
one or more memory devices storing computer-executable instructions which, when executed, cause the one or more processors to:
establish a wireless communication channel with an MR headset;
obtain sensor data representative of sensor output from a semiconductor manufacturing tool;
determine operational information of the semiconductor manufacturing tool based on the sensor data; and
cause the operational information comprising the sensor data to be transmitted to the MR headset via the communication channel, wherein the MR headset is configured to cause content associated with the sensor data to be rendered in an MR environment.

14. The MR control system of claim 13, wherein the MR control system is in communication with a digital twin, and wherein the sensor data comprises virtual sensor data obtained from the digital twin.

15. The MR control system of claim 13, wherein the operational information comprises an indication of a state of the digital twin.

16. The MR control system of claim 15, wherein the instructions further cause the one or more processors to transmit three-dimensional model information associated with at least a portion of the semiconductor manufacturing tool to the MR headset, wherein the MR headset renders content indicating the state of the digital twin based on the three-dimensional model information.

17. The MR control system of claim 13, wherein the MR control system is in communication with the semiconductor manufacturing tool, and wherein the sensor data comprises sensor data obtained from one or more physical sensors of the semiconductor manufacturing tool.

18. The MR control system of claim 13, wherein the operational information comprises a state of the semiconductor manufacturing tool.

19. The MR control system of claim 13, wherein the instructions, when executed, further cause the one or more processors to determine positions of one or more internal elements of the semiconductor manufacturing tool over time, wherein the operational information comprises information indicating the positions of the one or more internal elements of the semiconductor manufacturing tool over time relative to the semiconductor manufacturing tool.

20. The MR control system of claim 19 wherein the instructions, when executed, further cause the one or more processors to transmit three-dimensional model information associated with at least a portion of the semiconductor manufacturing tool including at least one of the one or more internal elements, wherein the three-dimensional model information is used by MR headset to render representations of the one or more internal elements based on the three-dimensional model information.

21. The MR control system of claim 13, wherein the instructions, when executed, further cause the one or more processors to:
receive, from the MR headset, a request for second operational information that is at least different in part from the operational information; and
cause the requested second operational information to be transmitted to the MR headset.

22. A method for controlling a semiconductor manufacturing tool via an MR session, the method comprising:
establishing, by an MR headset, a wireless communication channel with an MR control system;
obtaining, by the MR control system, sensor data representative of sensor output from a semiconductor manufacturing tool;
determining, by the MR control system, operational information associated with the semiconductor manufacturing tool and based, at least in part, on the sensor data;
transmitting, by the MR control system and responsive to the wireless communication channel being established with an MR headset, the operational information associated with the semiconductor manufacturing tool to the MR headset via the wireless communication channel;
receiving, by the MR headset, the operational information associated with the semiconductor manufacturing tool from the MR control system via the wireless communication channel, wherein the operational information comprises the sensor data obtained from one or more sensors of the semiconductor manufacturing tool; and rendering, by the MR headset, content associated with the sensor data and one or more control features in an MR environment.

23. The method of claim 22, further comprising:

identifying, by the MR headset, a wireless access point associated with the MR control system and a password associated with the wireless access point; and connecting to the wireless access point using the password.

24. The method of claim 22, wherein the rendered content comprises a user interface element that indicates a sensor value included in the sensor data obtained by the MR control system.

25. The method of claim 24, further comprising:

receiving, by the MR headset, a user input that indicates that the user interface element is to be fixed at a spatial coordinate with respect to the semiconductor manufacturing tool;

identifying a group of spatial coordinates in a coordinate system that is fixed with respect to the semiconductor manufacturing tool, wherein the group of spatial coordinates indicate borders of the user interface element with respect to a fixed spatial coordinate;

identifying a physical position and an orientation of the MR headset relative to the coordinate system; and modifying presentation of the user interface element based on the physical position and the orientation of the MR headset relative to the fixed spatial coordinate.

26. The method of claim 22, wherein the operational information comprises positions of one or more internal elements of the semiconductor manufacturing tool, wherein the rendered content comprises three-dimensional representations of the positions of the one or more internal elements of the semiconductor manufacturing tool over time, and wherein the three-dimensional representations of the positions of the one or more internal elements of the semiconductor manufacturing tool are rendered based on a physical position and orientation of the MR headset relative to the semiconductor manufacturing tool.

27. The method of claim 26, further comprising:

transmitting, by the MR control system, three-dimensional model information associated with the semiconductor manufacturing tool as part of the operational information; and receiving, by the MR headset, the three-dimensional model information, wherein the three-dimensional representations of the positions of the one or more internal elements are rendered based on the three-dimensional model information relative to the semiconductor manufacturing tool.

28. The method of claim 22, further comprising:

receiving, by the MR headset, one or more input signals associated with an operational instruction for the semiconductor manufacturing tool;

transmitting, responsive to receiving the one or more input signals, the operational instruction to the MR control system;

receiving, by the MR control system, the operational instruction from the MR headset; and transmitting, by the MR control system, a command to change a state of the semiconductor manufacturing tool or of a digital twin that represents the semiconductor manufacturing tool via a communications interface configured to be communicably connected with the semiconductor manufacturing tool.

29. The method of claim 22, wherein the sensor data comprises virtual sensor data generated by the digital twin, and wherein the instructions stored in the memory of the MR control system cause the one or more processors of the MR control system to receive the virtual sensor data from the digital twin.

30. The method of claim 22, further comprising:

receiving, by the MR headset, an input that indicates second operational information associated with the semiconductor manufacturing tool, wherein the second operational information is different at least in part from the operational information;

transmitting, by the MR headset, a request for the second operational information to the MR control system;

receiving, by the MR control system, the request for the second operational information;

transmitting, by the MR control system, the second operational information to the MR headset responsive to receiving the request; and rendering, by the MR headset, second content associated with the second operational information responsive to receiving the second operational information from the MR control system.

* * * * *